(12) United States Patent
Wu et al.

(10) Patent No.: US 7,949,188 B2
(45) Date of Patent: May 24, 2011

(54) IMAGE PROCESSING APPARATUS, IMAGE PROCESSING METHOD, AND PROGRAM

(75) Inventors: Weiguo Wu, Tokyo (JP); Bo Han, Beijing (CN); Takayuki Yoshigahara, Tokyo (JP)

(73) Assignee: Sony Corporation, Tokyo (JP)

( * ) Notice: Subject to any disclaimer, the term of this patent is extended or adjusted under 35 U.S.C. 154(b) by 888 days.

(21) Appl. No.: 11/777,775

(22) Filed: Jul. 13, 2007

(65) Prior Publication Data

US 2008/0118153 A1 May 22, 2008

(30) Foreign Application Priority Data

Jul. 14, 2006 (JP) ................................. 2006-194127

(51) Int. Cl.
*G06K 9/00* (2006.01)
(52) U.S. Cl. ........................................ 382/181; 707/705
(58) Field of Classification Search .................. 382/100, 382/181, 190, 195, 203, 209; 707/705, 708, 707/713
See application file for complete search history.

(56) References Cited

U.S. PATENT DOCUMENTS

| | | | | |
|---|---|---|---|---|
| 5,579,471 | A * | 11/1996 | Barber et al. ................. | 715/700 |
| 5,751,286 | A * | 5/1998 | Barber et al. ................. | 715/835 |
| 6,266,442 | B1 * | 7/2001 | Laumeyer et al. ............. | 382/190 |
| 7,397,931 | B2 * | 7/2008 | Imagawa et al. .............. | 382/103 |
| 2008/0118153 | A1 * | 5/2008 | Wu et al. ....................... | 382/190 |

FOREIGN PATENT DOCUMENTS

| | | |
|---|---|---|
| JP | 2002-344872 | 11/2002 |
| JP | 2006-54622 | 2/2006 |

OTHER PUBLICATIONS

Takehiro Mochizuki et al., *Baseball Video Indexing Using Patternization of Scenes and Hidden Markov Model*, Institute of Electronics, Information and Communication Engineers technical study reports, Japan, Science and Technical Research Laboratories, NHK (Japan Broadcasting Corporation), vol. 105, No. 118, pp. 37-42 (Jun. 9, 2005).

Nguyen Huu Bach et al., *Automatic Video Indexing of Baseball Broadcast Using a Hidden Markov Model*, Information and Communication Engineers technical study reports, Information, Department of Computer Science, Graduate School of Information Science and Engineering, Tokyo Institute of Technology, vol. 104, No. 450, pp. 13-18 (Nov. 12, 2004).

Notification of Reasons for Refusal, in corresponding Japanese patent application No. 2006-194127, and English-language translation of same.

* cited by examiner

*Primary Examiner* — Anand Bhatnagar
(74) *Attorney, Agent, or Firm* — Finnegan, Henderson, Farabow, Garrett & Dunner, L.L.P.

(57) ABSTRACT

An image processing apparatus is disclosed which processes moving images each divisible into a plurality of shots, the image processing apparatus including: a holding unit configured to hold discrimination models acquired by learning beforehand a first rule and a second rule from a moving image formed by a plurality of known shot groups which are made up of at least one shot each and from which a highlight is to be extracted in accordance with the discrimination models, the first rule governing relevance between the shots, the second rule governing relevance between frames within each of the shots; and an extraction unit configured to extract from a newly input moving image a shot group recognized as the highlight in accordance with the discrimination models held in the holding unit.

8 Claims, 38 Drawing Sheets

FIG.20
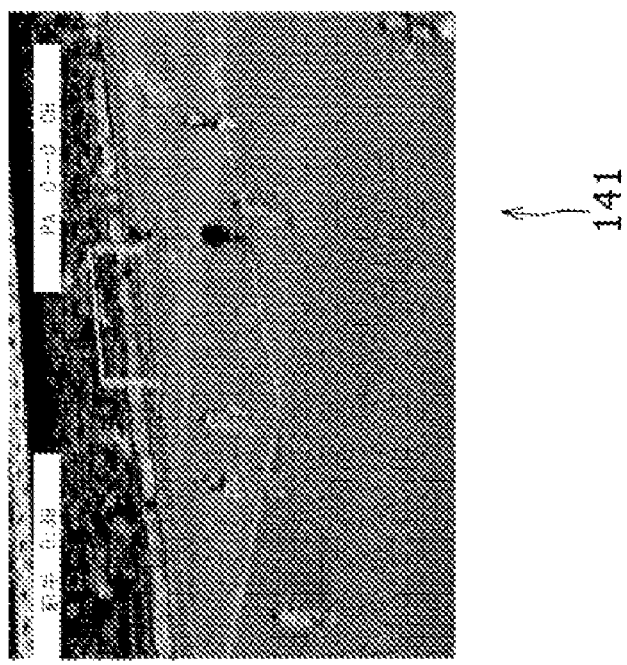
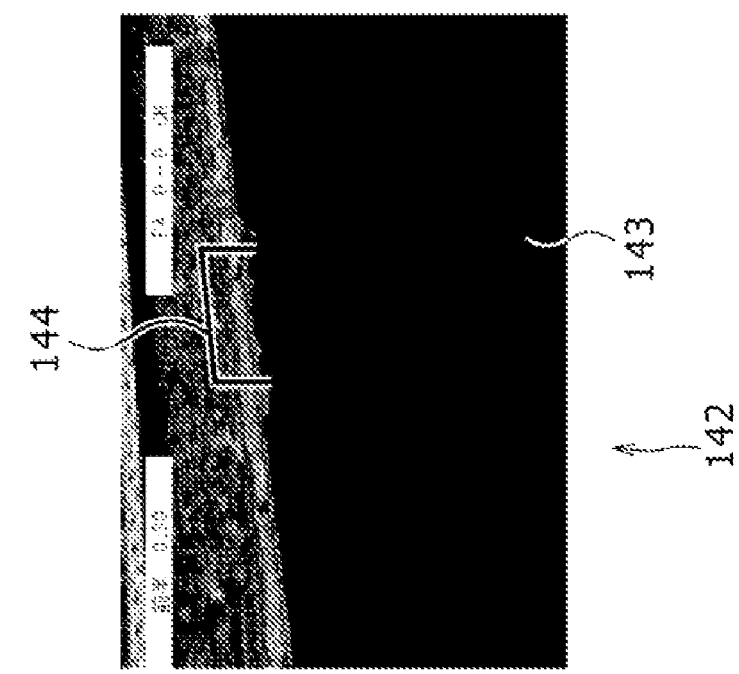

172

173

174

FIG.36
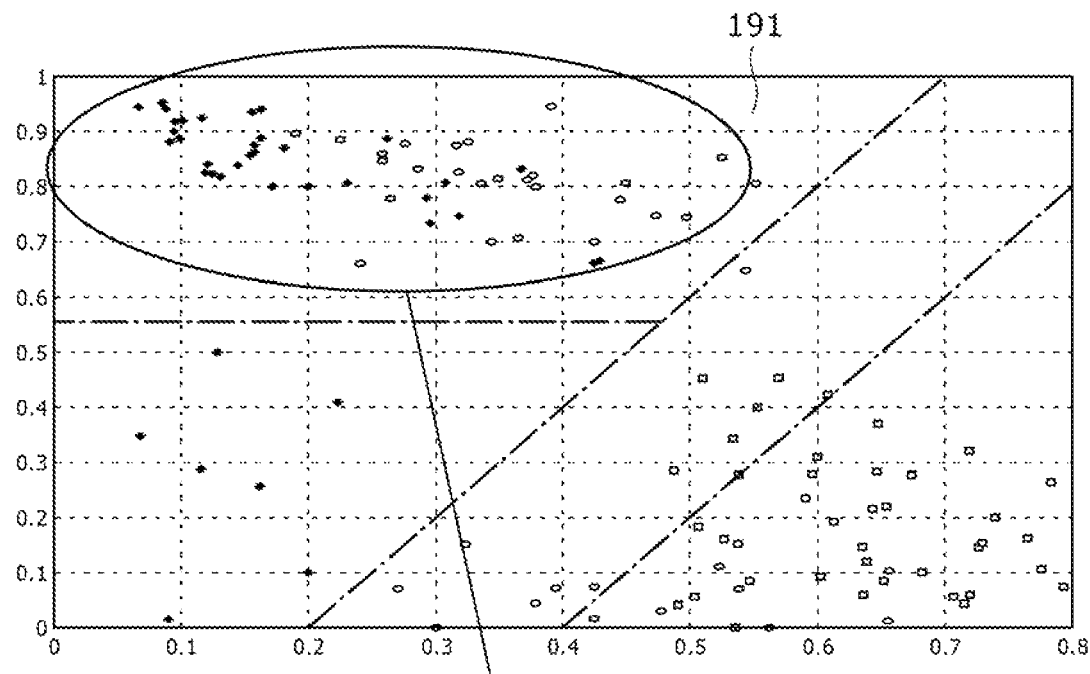
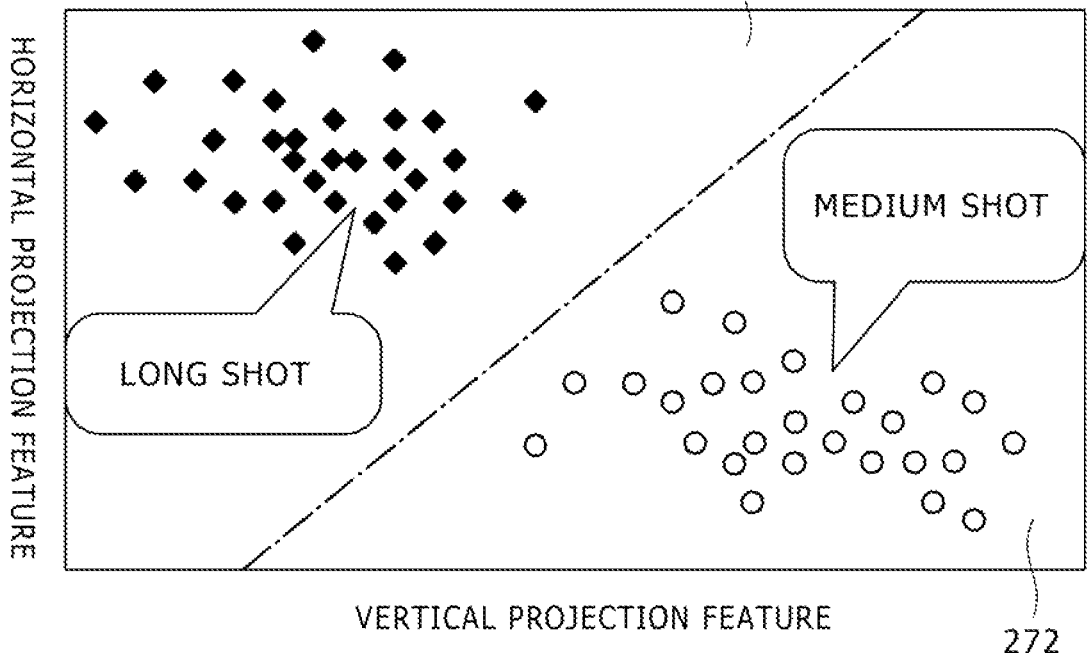

IMAGE PROCESSING APPARATUS, IMAGE PROCESSING METHOD, AND PROGRAM

CROSS REFERENCES TO RELATED APPLICATIONS

The present invention contains subject matter related to Japanese Patent Application JP 2006-194127 filed with the Japan Patent Office on Jul. 14, 2006, the entire contents of which being incorporated herein by reference.

BACKGROUND OF THE INVENTION

1. Field of the Invention

The present invention relates to an image processing apparatus, an image processing method, and a program. More particularly, the invention relates to an image processing apparatus, an image processing method, and a program offering image analyzing techniques for managing image contents more effectively than before to let people handle the contents in an intuitive manner.

2. Description of the Related Art

With rapid progress in the digitizing techniques used in such fields as the Internet, broadcasting, communications, entertainment, medical care and education, there has been a growing need in recent years for accessing necessary information easily and rapidly out of huge quantities of multimedia information available. Particularly noteworthy is the need for efficiently managing and treating large amounts of image contents accumulated on networks and in home servers. That need prompted energetic efforts of research and development on image recognition techniques for analyzing and extracting significant images from image contents.

More specifically, with hard disk recorders and digital home appliances coming into general use today, research and development is being conducted on what may be termed similar image searching techniques that allow people to enjoy a new lifestyle of entertainment. The techniques, if implemented, would illustratively allow only preferred TV programs to be recorded for subsequent viewing or recorded while being reproduced for concurrent viewing. Furthermore, with digital cameras, digital video cameras and the Internet gaining widespread use, research and development is being carried out on what may be called digest, image creating techniques whereby various still and moving images would easily be edited into personalized original digest images to be preserved. Examples of these techniques are disclosed illustratively in Japanese Patent Laid-open Nos. 2002-344872 and 2006-54622.

Such developments converge on the need for innovative image searches whereby the above-mentioned new lifestyle of entertainment would be brought about or digest images would be created. Illustratively, there has been a strong need for searching still image contents for desired images or searching moving image contents for highlight scenes.

The efforts to meet the above-mentioned need for image searches include attempts to commercialize keyword-based image searching techniques. Also underway are the efforts to develop browsing techniques for browsing moving image contents at will, as well as techniques for creating "video minutes" of conferences deemed significant in terms of visual communication.

SUMMARY OF THE INVENTION

However, the efforts so far to implement the keyword-based image search have encountered setbacks such as an inordinate amount of time and effort required to append necessary keywords to images, or recurrent presence of large quantities of stored images with the same keyword. The results of these efforts have thus been disappointing. Other efforts to develop the related techniques have yet to yield commercially viable results. Illustratively under study are techniques for automatically extracting meta information from images and finding desired image contents based on the extracted meta information, as well as associated techniques for automatically creating video minutes, for digesting images in personalized fashion, or for browsing image contents as desired. In any of these cases, the difficulty lies in how to extract necessary meta information with precision.

In other words, there has been much demand, for image analyzing techniques arranged to manage and handle image contents more efficiently so as to perform intuitive, not keyword-based, searches for specific images. The demand has yet to be met satisfactorily.

The present invention has been made in view of the above circumstances and provides image analysing techniques for efficiently managing and treating image contents in intuitive fashion.

In carrying out the present invention and according to one embodiment thereof, there is provided an image processing apparatus for processing moving images each divisible into a plurality of shots, the image processing apparatus including: a holding unit configured to hold discrimination models acquired by learning beforehand a first rule and a second rule from a moving image formed by a plurality of known shot groups which are made up of at least one shot each and from which a highlight is to be extracted in accordance with the discrimination models, the first rule governing relevance between the shots, the second rule governing relevance between frames within each of the shots; and an extraction unit configured to extract from a newly input moving image a shot group recognized as the highlight in accordance with the discrimination models held in the holding unit.

Preferably, the discrimination model based on the first rule may be a time-series model acquired by learning a plurality of shot types as a state each; and from the newly input moving image, the extraction unit may extract the shot group recognized as the highlight representative of state transition between the shot types in accordance with the time-series model.

The time-series model above may preferably be a hidden Markov model known as HMM.

Preferably, the discrimination model based on the second rule may be a time-series model acquired by learning a plurality of frame types as a state each; and from the newly input moving image, the extraction unit may extract the shot group including shots recognized as the highlight representative of state transition between the frame types in accordance with the time-series model.

Preferably, the time-series model above may also be a hidden Markov model known as HMM.

Preferably, the plurality of frame types may each be defined on the basis of at least one object feature includable in a frame; the image processing apparatus may further include a feature extraction unit configured to attempt extracting each of such at least one object feature from a plurality of frames constituting the newly input moving image; and the extraction unit may extract, the highlight on the basis of what is recognized as each of the frame types in the plurality of frames constituting the newly input moving image, the extractions being based on the attempt made by the feature extraction unit.

According to another embodiment of the present invention, there is provided an image processing method for use with an image processing apparatus for processing moving images each divisible into a plurality of shots, the image processing method including the steps of: holding, in the image processing apparatus, discrimination models acquired by learning beforehand a first rule and a second rule from a moving image formed by a plurality of known shot groups which are made up of at least one shot each and from which a highlight is to be extracted in accordance with the discrimination models, the first rule governing relevance between the shots, the second rule governing relevance between frames within each of the shots; and extracting from a newly input moving image a shot group recognized as the highlight in accordance with the discrimination models being held.

According to a further embodiment of the present invention, there is provided a program for causing a computer to execute a procedure including the same steps as those of the inventive image process method outlined above.

Where the image processing apparatus, image processing method, or program of the present invention is in use, moving images each divisible into a plurality of shots are processed as follows: the image processing apparatus or like equipment is arranged to hold discrimination models acquired by learning beforehand a first rule and a second rule from a moving image formed by a plurality of known shot groups which are made up of at least one shot each and from which a highlight is to be extracted in accordance with the discrimination models, the first rule governing relevance between the shots, the second rule governing relevance between frames within each of the shots. From a newly input moving image, a shot group is extracted when recognized as the highlight in accordance with the discrimination models being held.

The present invention, when embodied illustratively as outlined above, offers image analyzing techniques, especially the techniques for managing image contents more efficiently than before in order to let users handle images in an intuitive manner.

BRIEF DESCRIPTION OF THE DRAWINGS

FIG. 20 is another schematic view explanatory of what object feature is extracted by the object feature extraction unit in FIG. 1 and how it is extracted;

FIG. 36 is a graphic representation explanatory of another typical information for use in the shot classifying process of FIG. 31;

FIG. 41 is a schematic view explanatory of how learning is performed by the learning unit of FIG. 40 and what a model acquired through such learning looks like;

FIG. 42 is another schematic view explanatory of how learning is performed by the learning unit of FIG. 40 and what a model acquired through such learning looks like;

FIG. 43 is another schematic view explanatory of how learning is performed by the learning unit of FIG. 40 and what a model acquired through such learning looks like;

FIG. 44 is another schematic view explanatory of how learning is performed by the learning unit of FIG. 40 and what a model acquired through such learning looks like.

DETAILED DESCRIPTION OF THE PREFERRED EMBODIMENTS

Figure 1:
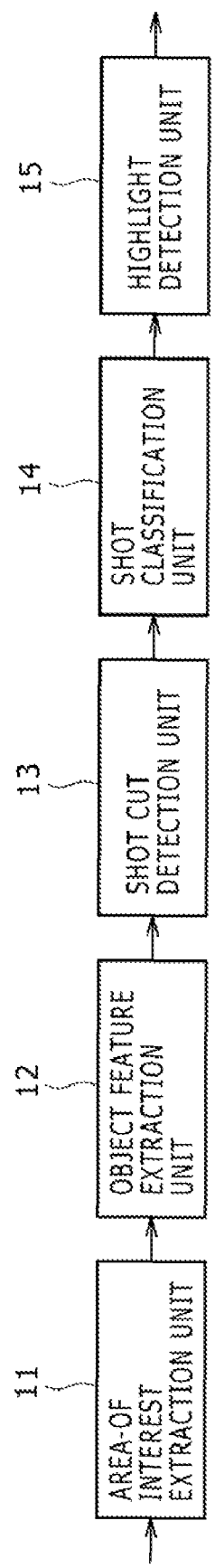
FIG. 1 is a functional block diagram showing a typical functional structure of an image processing apparatus according to the present invention.

What is described below as the preferred, embodiments of the present invention corresponds to the appended claims as follows; the description of the preferred embodiments basically provides specific examples supporting what is claimed. If any example of the invention described below as a preferred embodiment does not have an exactly corresponding claim, this does not mean that the example in question has no relevance to the claims. Conversely, if any example of the invention described hereunder has a specifically corresponding claim, this does not mean that the example in question is limited to that claim or has no relevance to other claims.

Furthermore, the description below of the preferred embodiments does not claim to include all examples corresponding to the whole claims. In other words, the description hereunder does not limit or deny any inventive entities which are not covered by the appended claims of the present invention but which may be added or brought about by this applicant in the future by divisional application or by amendment.

One preferred embodiment of the present invention is an image processing apparatus (e.g., image processing apparatus in FIG. 1, particularly its highlight detection unit 15) for processing moving images each divisible into a plurality of shots, the image processing apparatus including: a holding unit (e.g., model holding unit 302 in FIG. 38) configured to hold discrimination models acquired by learning beforehand (e.g., learning unit 301 in FIG. 38) a first rule (e.g., rule of relevance on layer 1 in FIG. 37) and a second rule (e.g., rule of relevance on layer 2 in FIG. 37) from a moving image formed by a plurality of known shot groups which are made up of at least one shot each and from which a highlight is to be extracted in accordance with the discrimination models, the first rule governing relevance between the shots, the second rule governing relevance between frames within each of the shots; and an extraction unit (e.g., highlight extraction unit 306 in FIG. 38) configured to extract from a newly input moving image a shot group recognized as the highlight in accordance with the discrimination models held in the holding unit.

Preferably, the discrimination model based on the first rule may be a time-series model (e.g., HMM in FIG. 41 in which each of S11 through S14 corresponds illustratively to one of "Long," "Medium," "Close-up" and "Out" in FIG. 30) acquired by learning a plurality of shot types as a state each; and from the newly input moving image, the extraction unit may extract the shot group recognized as the highlight representative of state transition between the shot types in accordance with the time-series model.

Preferably, the discrimination model based on the second rule may be a time-series model (e.g., HMM in FIG. 43 in which each of S21 through S28 corresponds illustratively to one of "Middle," "Goal Box," "Upper Corner," "Lower Corner," "Unknown," "Upper Goal" and "Lower Goal" in FIG. 42) acquired by learning a plurality of frame types as a state each; and from the newly input moving image, the extraction, unit may extract the shot group including shots recognized as the highlight representative of state transition between the frame types in accordance with the time-series model.

Figure 37:
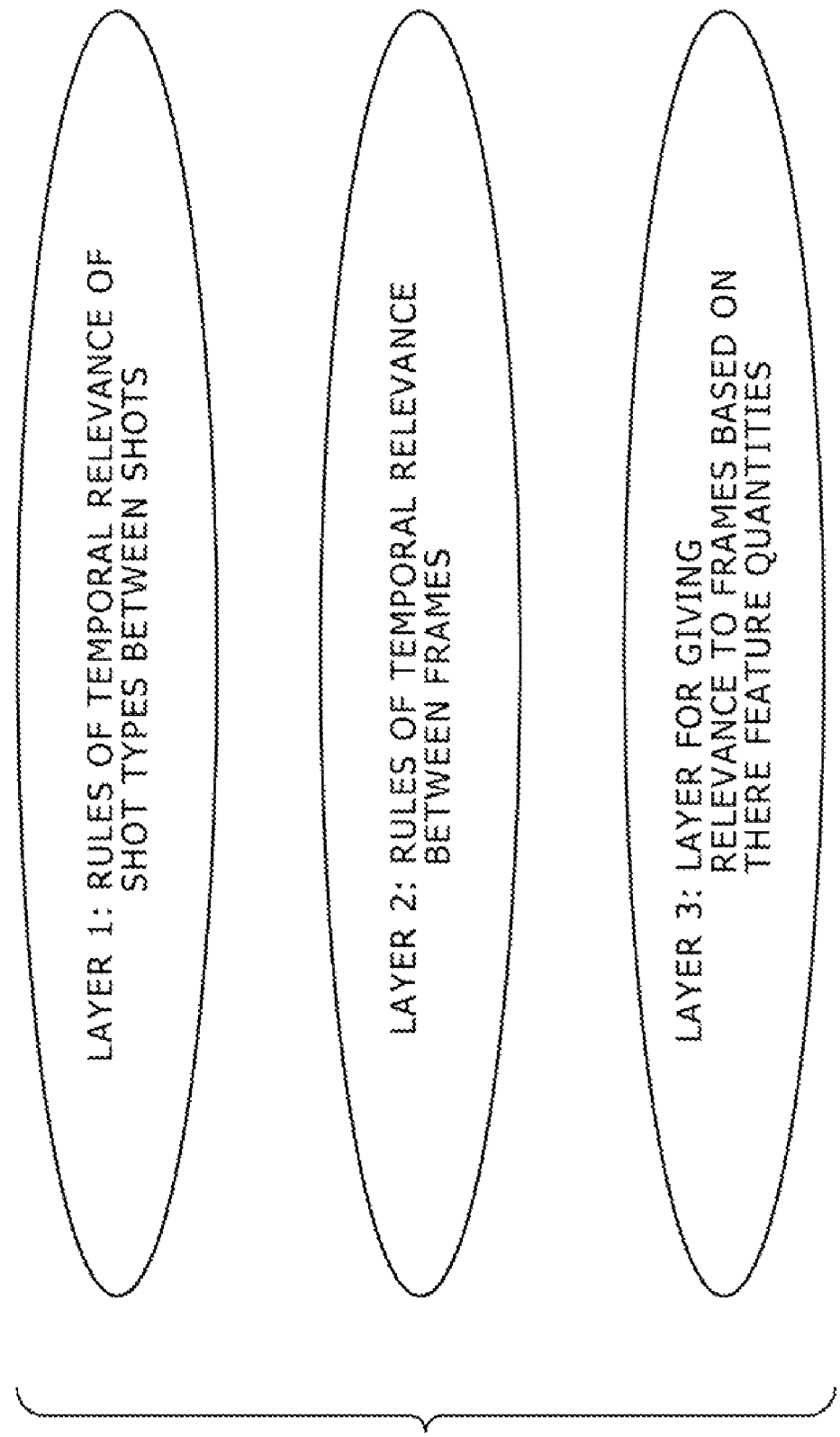
FIG. 37 is a schematic view explanatory of the basic concept of highlight extraction performed by a highlight detection unit in FIG. 1.
Figure 42:
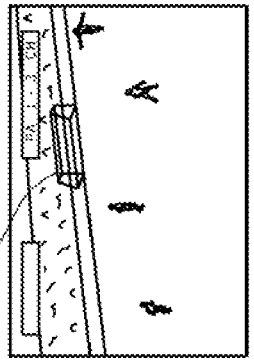

Preferably, the plurality of frame types may each be defined on the basis of at least one object feature (e.g., white centerline 371, goal box 372, and corner position 373 in FIG. 42) includable in a frame; the image processing apparatus may further include a feature extraction unit (e.g., object feature extraction unit 12 in FIG. 1) configured to attempt extracting each of such at least one object feature from a plurality of frames constituting the newly input moving image; and the extraction unit may extract the highlight on the basis of what is recognized as each of the frame types in the plurality of frames constituting the newly input moving image, the extractions being based on the attempt made by the feature extraction unit (e.g., extraction performed on layer 2 based on layer 3 in FIG. 37).

Figure 39:
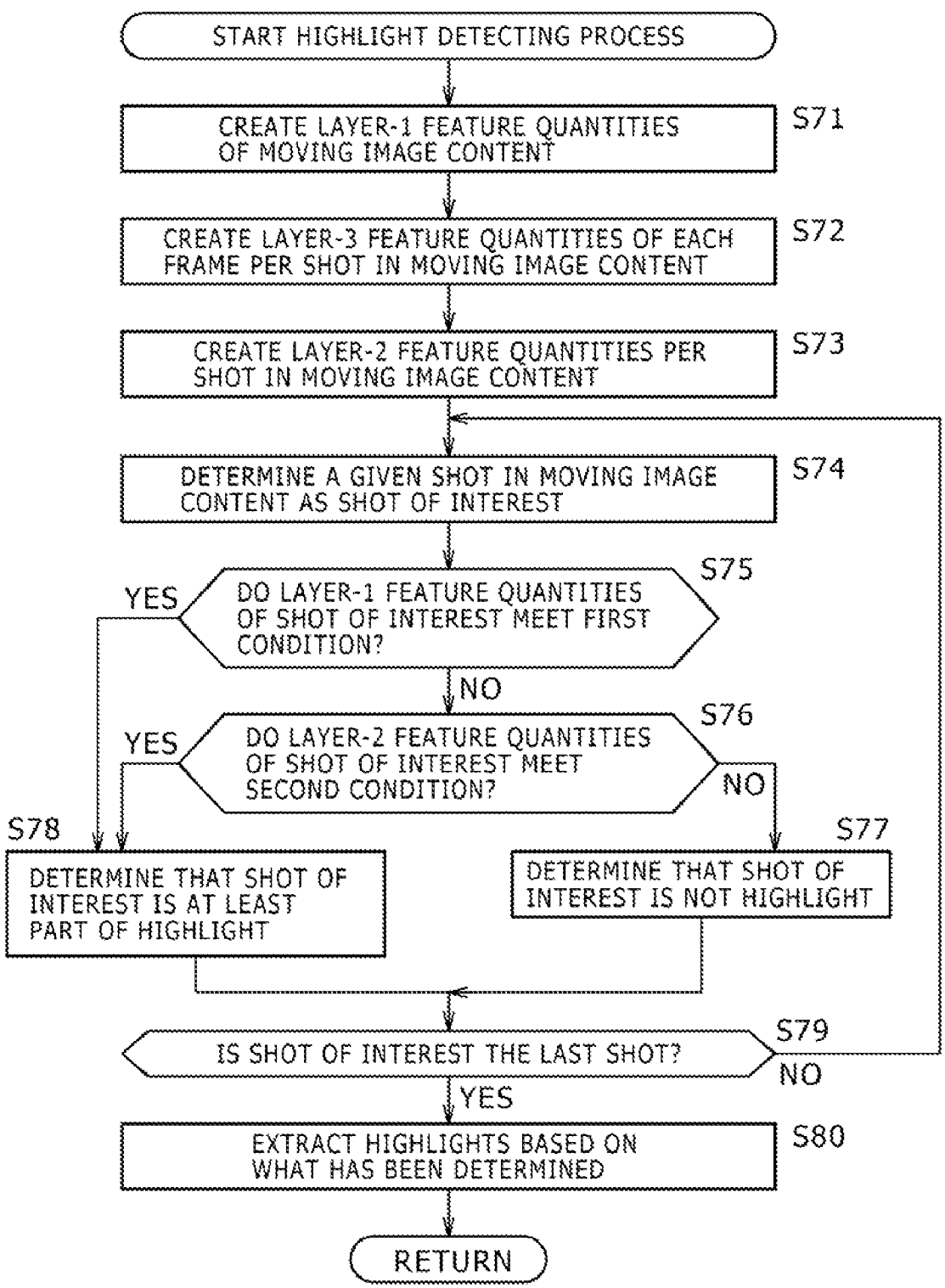
FIG. 39 is a flowchart of detailed steps constituting a highlight detecting process in step S5 of FIG. 2, the process being performed by the highlight detection unit of FIG. 38.

Another preferred embodiment of the present invention is an image processing method (e.g., image processing in FIG. 2, especially step S5 representing the highlight detecting process of FIG. 39) for use with an image processing apparatus for processing moving images each divisible into a plurality of shots, the image processing method including the steps of: holding, in the image processing apparatus, discrimination models (e.g., first condition of step S75 and second condition of step S76 in FIG. 39) acquired by learning beforehand a first rule and a second rule from a moving image formed by a plurality of known shot groups which are made up of at least one snot each and from which a highlight is to be extracted in accordance with the discrimination models, the first rule governing relevance between the shots, the second rule governing relevance between frames within each of the shots; and extracting (e.g., in steps S71 through S80 of FIG. 39) from a newly input moving image a shot group recognized as the highlight in accordance with the discrimination models being held.

A further preferred embodiment of the present invention is a program for causing a computer (e.g., personal computer in FIG. 45) to execute a procedure including the same steps as those of the inventive image process method outlined, above.

The present invention, in its many embodiments as outlined above, is intended to address image contents that have been created by innovative activities of people. Typical image contents include movies, music, plays, literature, photos, cartoons, animations, computer games and related productions composed of letters, figures, colors, voices, performances and images, or of combinations of any of these items; and programs for causing computers to provide information about any of such materials. Of the above-listed works, those predominantly including images will be called image contents in this specification. The image contents fall into two broad categories: still image contents mainly formed by still, images, and moving image contents primarily made up of moving images. The ensuing description will mostly focus on moving image contents.

In this specification, the term "contents" will be used broadly to designate what is generally called content data, i.e., data, or other intangible materials created by innovative human activities in a manner that can be processed by devices and apparatuses, including electrical signals committed to mechanical memory in retrievable fashion. In this context, frames, fields, and other sets of data constituting part of moving images will also be referred to as moving image contents in the ensuing description.

For the present invention, it is assumed that moving image contents are processed in access units such as frames or fields. More specifically, the access units refer to each of the still images (e.g., frames) that make up a moving image, as well as to parts (e.g., fields) forming each of such still images. For purpose of simplification and illustration, it is assumed here that the moving image is processed in increments of frames.

Figure 3:
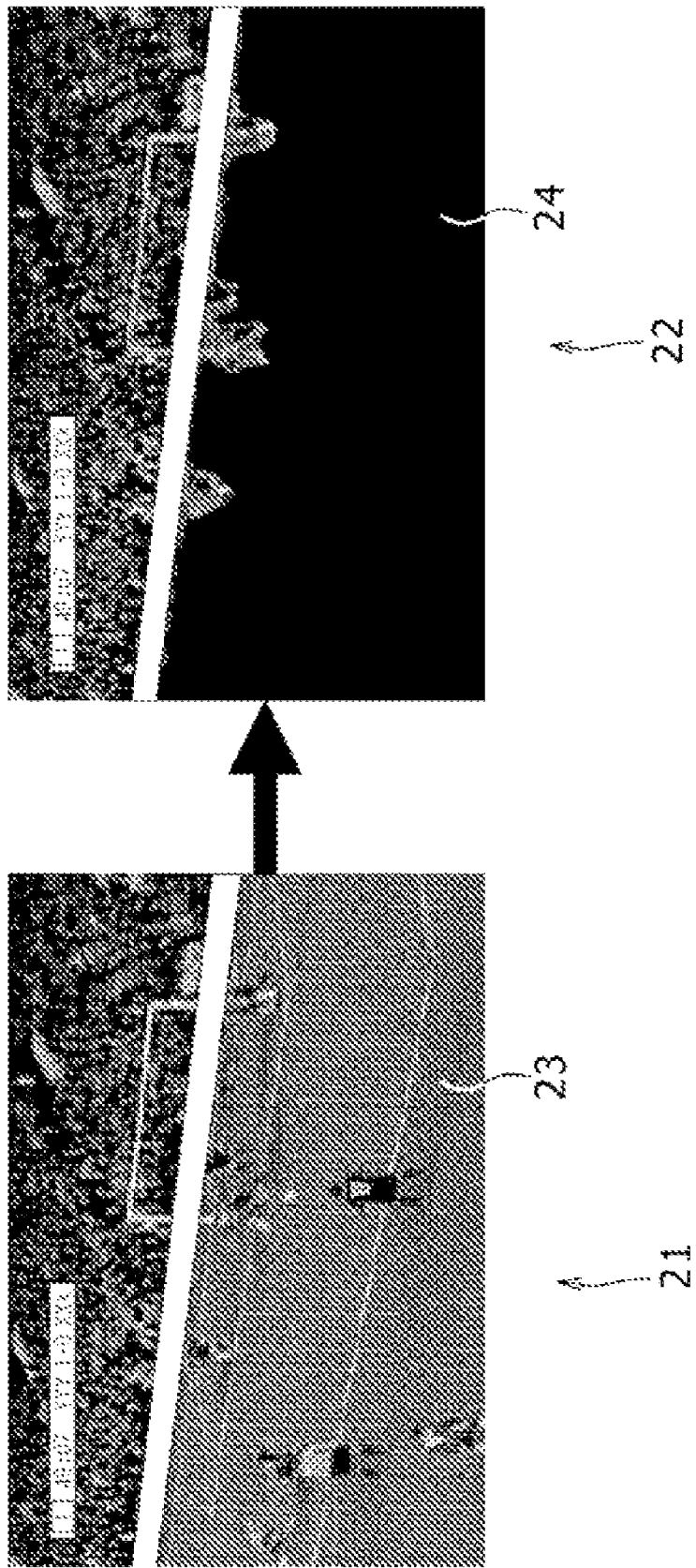
FIG. 3 is a schematic view showing a typical result of executing step S1 in FIG. 2.
Figure 4:
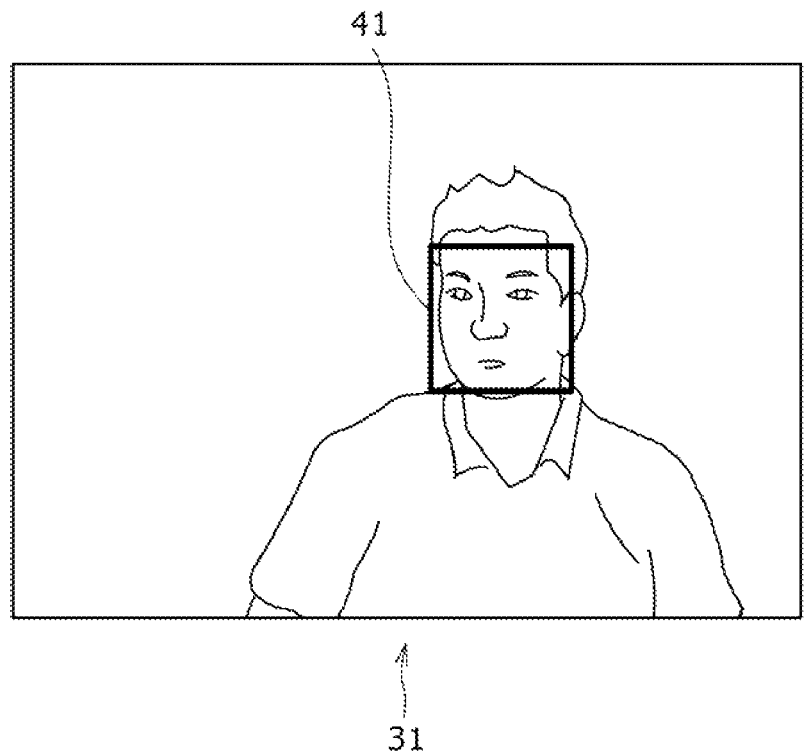
FIG. 4 is a schematic view showing a typical result of executing step S2 in FIG. 2.

Examples of images processed according to the present invention are depicted in some of the accompanying drawings. With copyright protection taken into account, these images are shown not in their original form but in a manner hollowed out or schematized as needed. For example, images 21 and 22 in FIG. 3 (to be discussed later) are not the original images but images with two hollow bands superposed each, one hollowing out the fence between the playfield and the stands, the other giving time and score point indications in a hollow space. Whereas FIG. 3 gives an example in which an area of interest 24 (to be described later) is shown detected, it should be noted that this area of interest 24 has been extracted not from the partially hollowed image 21 of FIG. 3 but from the original image. Likewise, while FIG. 4 (also to be discussed later) gives an example in which a player's face 41 is shown detected from a frame 31, it should noted that the face 41 has been extracted not from the schematized frame 31 of FIG. 4 but from the data of the actual image prior to schematization involved in image processing.

FIG. 1 is a functional block diagram showing a typical functional structure of an image processing apparatus according to the present invention.

This image processing apparatus is structured so as to include units ranging from an areas-of-interest extraction unit 11 to a highlight detection unit 15.

Figure 2:
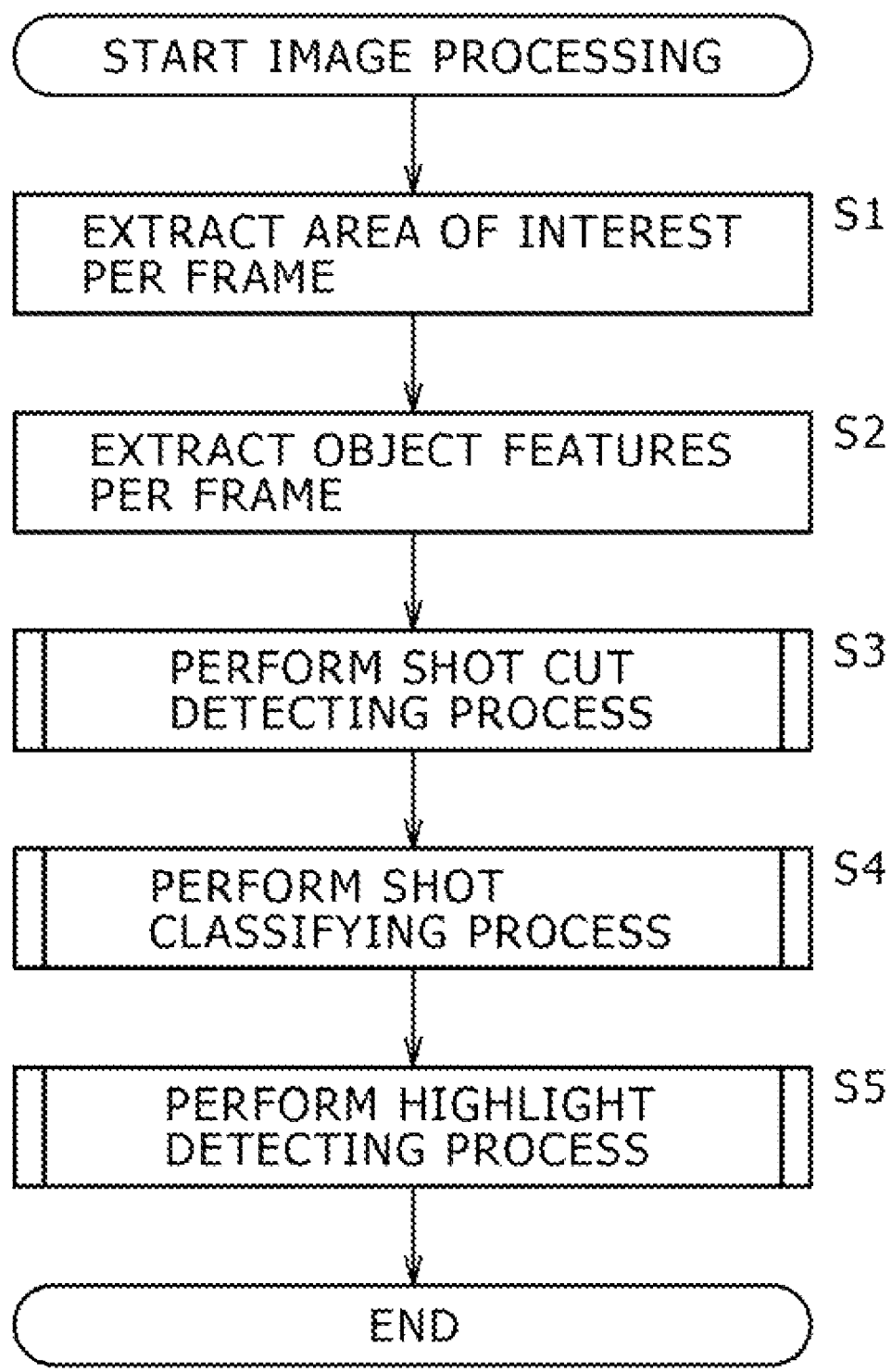
FIG. 2 is a schematic view showing typical steps of image processing performed by the image processing apparatus of FIG. 1.

FIG. 2 is a schematic view showing typical steps of image processing performed by the image processing apparatus of FIG. 1.

In step S1, the area-of-interest extraction unit 11 extracts what may be called the area of interest from each frame.

The area of interest refers to the area corresponding to one noteworthy background out of at least one background of the real world inside a still image (one frame in this case) obtained by photographing real-world objects.

For example, suppose that images of a soccer match are taken up as a moving image content. In this case, the real-world objects being imaged are players and related people, as well as the ball and other match-related facilities. There are two major backgrounds in this real world: the playfield (i.e., the place where the grass is) on which the soccer match is played, and the remaining area, notably the stands. Since what is taking place in the image is a soccer match, the playfield should be extracted as the area of interest. The area-of-interest extraction unit 11 may thus extract the image area corresponding to the real-world playfield (called the playfield area hereunder) as the area of interest out of all areas included in the frame in question.

Illustratively, the image 21 in FIG. 3 is an image of a soccer match. An area 23 represents the playfield area. The area-of-interest extraction unit 11 extracts the playfield area 23 as the area of interest 24. After the playfield area 23 has been extracted as the area of interest 24, the image 22 is obtained.

As will be discussed later in detail with reference to FIGS. 12 through 16, the area-of-interest extraction unit 11 checks to determine whether the playfield area is included in the frame of interest being processed (called the frame of interest hereunder), using previously learned image feature models (e.g., HSV histogram model, to be described later) of the playfield area. If the playfield area is found included in the frame of interest, that area is extracted as the area of interest.

The playfield area is only an example of the area of interest in effect when the images of sports such as soccer are adopted as the moving image content. The area of interest can be varied. For example, if the images of a broadcast program picked up on a set in a TV studio are adopted as a moving image content, the set may be found noteworthy and the image area corresponding to the set may be detected as the area of interest. If the images of a concert, are adopted as a moving image content, the stage of the concert may be found noteworthy and the image area corresponding to the stage may be detected as the area of interest. That is, if any background of a real world with colors and features turns out to feature an HSV histogram (to be described later) when picked up, then that background may be detected as the area of interest.

In step S2, an object feature extraction unit 12 extracts object features from each frame.

The object features refer to image information indicative of the features of objects that are found inside the area of interest or in adjacent areas. Also considered objects are boundary lines between the area of interest and any other area, as well as points of intersection between at least two boundary lines. The image information representative of the features of these objects is also included in the object features. The image information constitutes a broad concept that includes not only color information about objects but also information about object positions.

Figure 5:
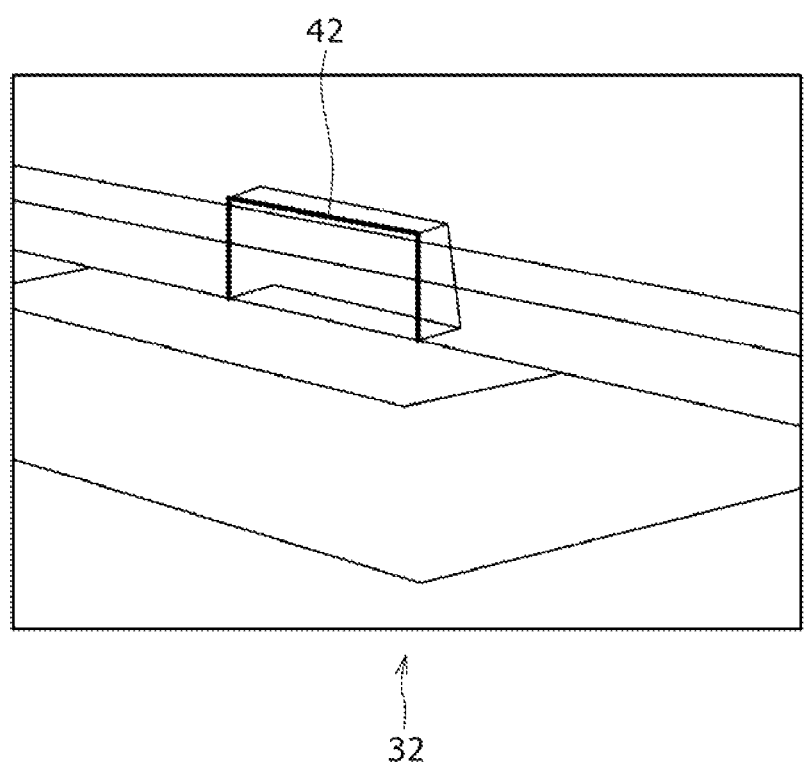
FIG. 5 is a schematic view showing another typical result of executing step S2 in FIG. 2.
Figure 6:
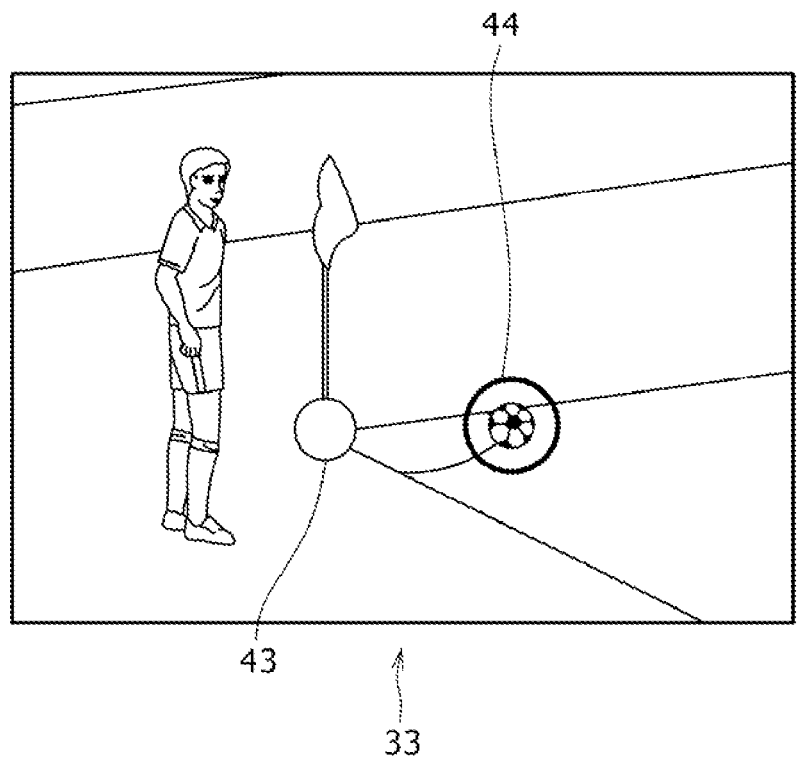
FIG. 6 is a schematic view showing another typical result of executing step S2 in FIG. 2.
Figure 7:
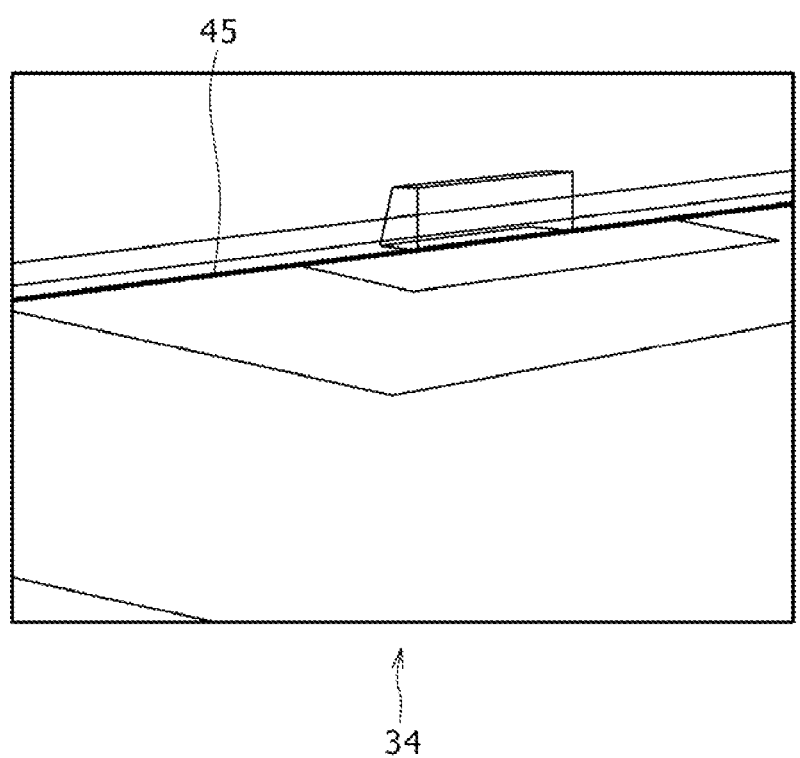
FIG. 7 is a schematic view showing another typical result of executing step S2 in FIG. 2.

For example, suppose that the images of a soccer match are being used as the moving image content. In this case, the playfield area is regarded as the area of interest. What may be detected from that area is image information indicative of the features of the people present in the playfield area, such as players. More specifically, in the example of FIG. 4, the player's face 41 is detected as an object feature from the frame 31. In the example of FIG. 5, a goal gate 42 is detected from, a frame 32 as object feature information about something other than the people inside the playfield area or in adjacent areas. In the example of FIG. 6, a corner position 43 and the bail 44 are detected from a frame 33. In the example of FIG. 7, a playfield boundary 45 is detected as an object feature. Although not shown, white lines may also be detected as an object feature.

How object features are detected will be discussed later in more detail by referring to FIGS. 17 through 27.

In step S3 back in FIG. 2, a shot cut detection unit 13 performs the process of detecting each shot cut from within the moving image content (called the shot cut detecting process hereunder). In other words, what is detected are shots between shot cuts.

Figure 8:
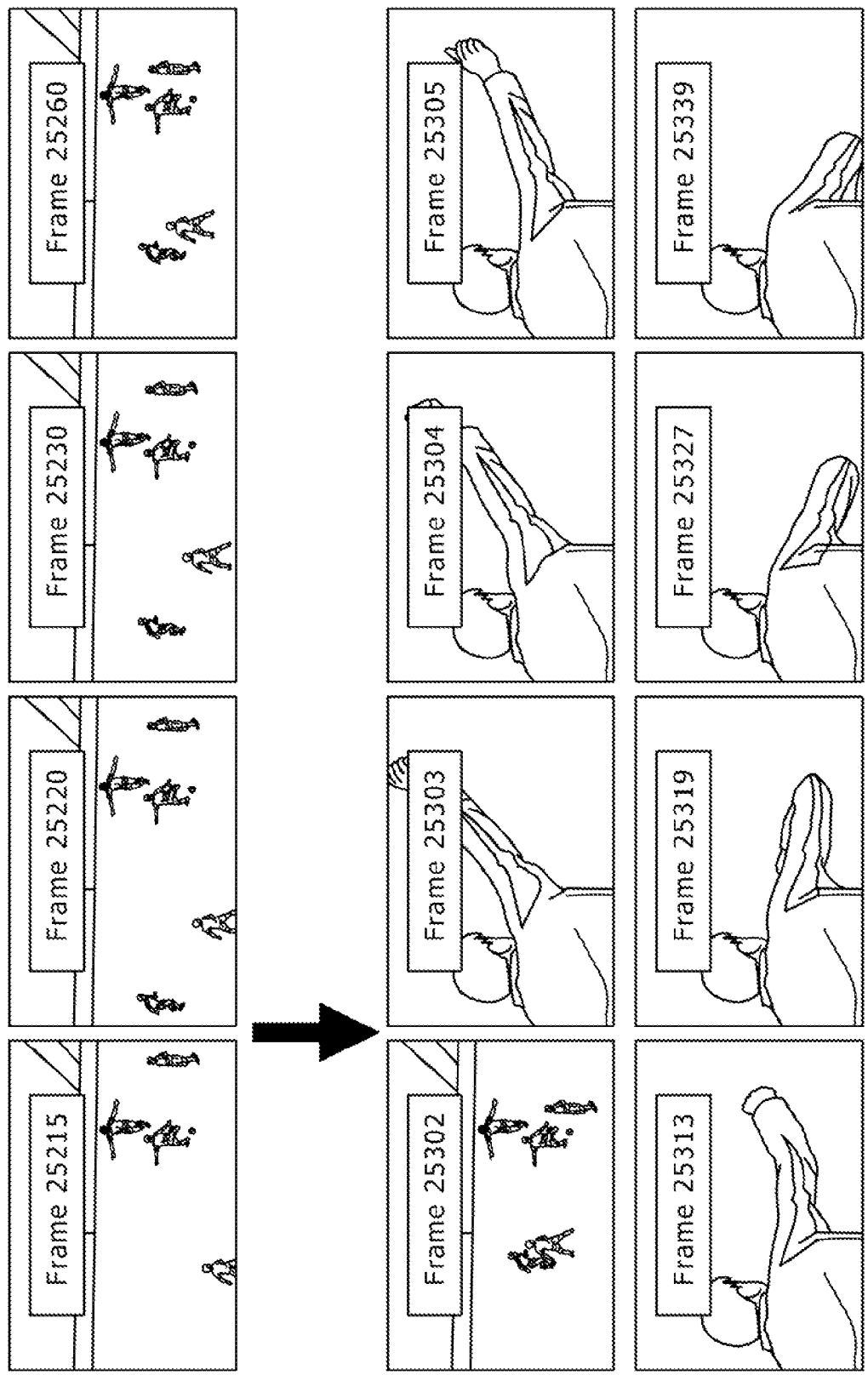
FIG. 8 is a schematic view showing a typical result of executing step S3 in FIG. 2.

In the example of FIG. 8, a shot cut is detected between two frames named "Frame 25302" and "Frame 25303" in the moving image content of soccer match images. In FIG. 8, the images furnished with indications "Frame 25215" through "Frame 25339" represent frames having their respective frame numbers. In this example, the frames numbered 25215 through 25302 are detected collectively as a first shot, and the frames numbered 25303 through 25339 are detected collectively as a second shot distinct from the first shot.

The shot cut detecting process will be discussed later in more detail with reference to FIGS. 28 and 29.

In step S4 back in FIG. 2, a shot classification unit 14 performs the process of classifying each of the shots in the moving image content into one of a plurality of predefined shot types (the process will be called the shot classifying process hereunder).

Figure 9:
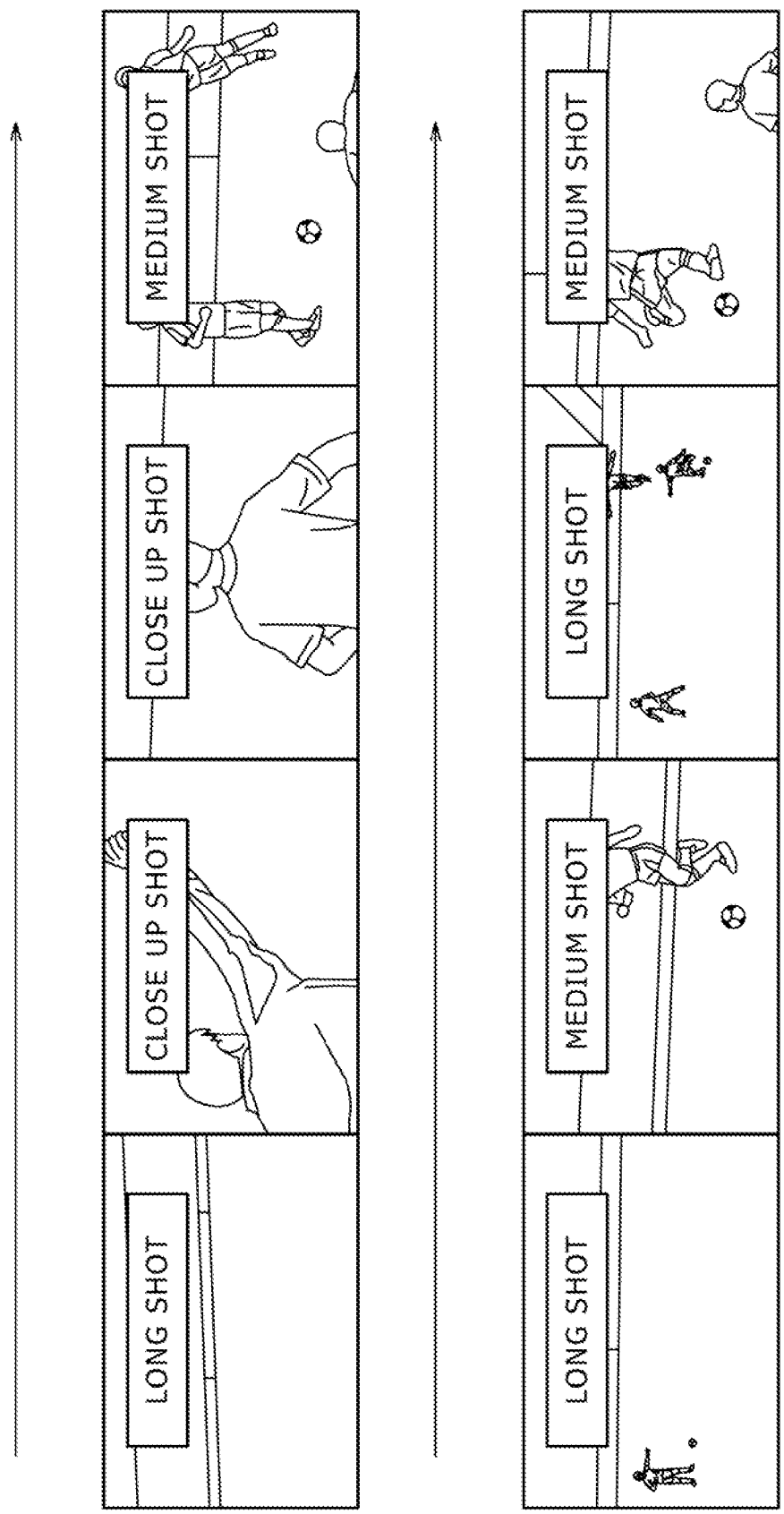
FIG. 9 is a schematic view showing a typical result of executing step S4 in FIG. 2.

In the example of FIG. 9, each image denotes a single shot. Eight consecutive shots are shown picked up chronologically, as indicated by arrows representing the passage of time, from the moving image content of soccer match images. These shots are classified as "Long," "Close-up," "Close-up," "Medium," "Long," "Medium," "Long," and "Medium," respectively.

The classified shot types such as "Long" will be explained later in reference to FIG. 30 and related drawings. The shot classifying process will be discussed later in more detail by referring to FIGS. 31 through 36.

In step S5 back in FIG. 2, the highlight detection unit 15 performs the process of detecting a highlight (called the highlight detecting process hereunder) from the moving image content based illustratively on the object features extracted in step S2 and on the shot types classified in step S4. Illustratively, the highlight detecting process is carried out in accordance with the changes in feature quantities between frames of each shot and with the chronological features between shots. As needed, the highlight detection unit 15 may further create a digest from the highlights.

Figure 10:
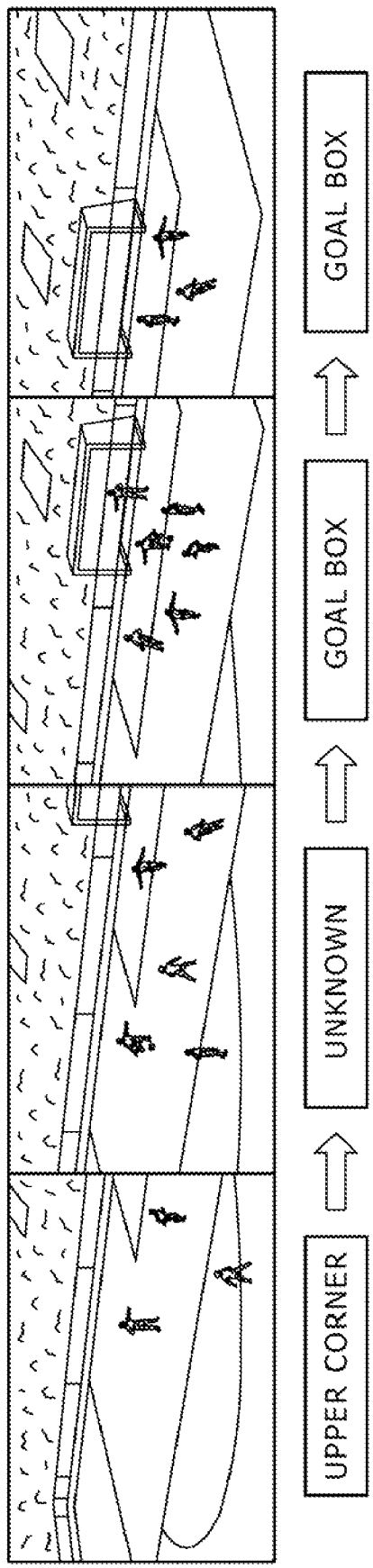
FIG. 10 is a schematic view showing a typical example of executing step S5 in FIG. 2.
Figure 11:
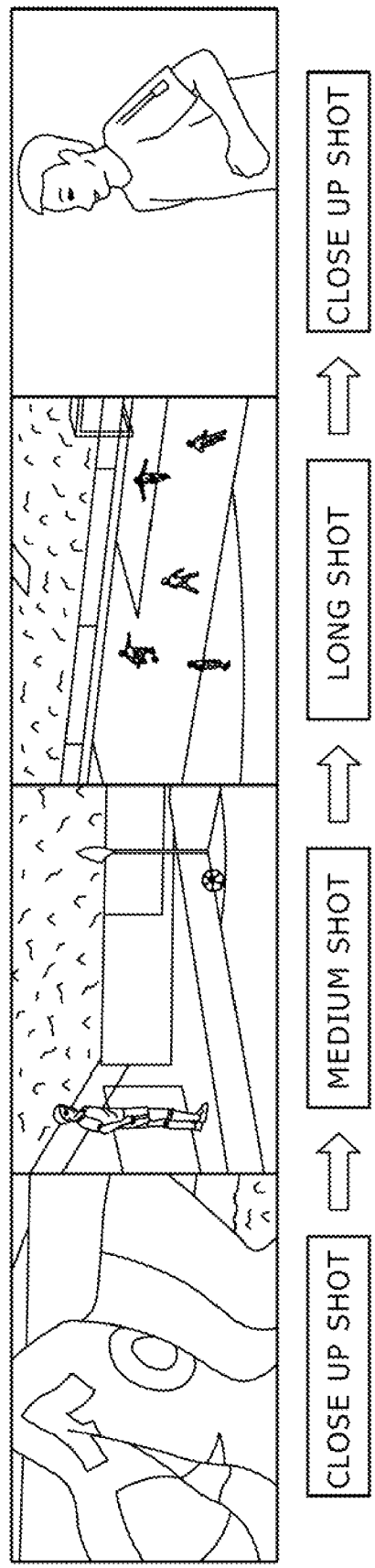
FIG. 11 is a schematic view showing another typical example of executing step S5 in FIG. 2.

FIGS. 10 and 11 show examples of information for allowing series of scenes corresponding to a corner kick to be detected as highlights from the moving image content of soccer match images.

Illustratively, FIG. 10 shows how a highlight is detected from the changes in feature quantities between frames of each shot. In this example, the feature quantities (called frame types, to be discussed later) between the frames of a particular shot make transition from "Upper Corner" to "Unknown" to "Goal Box" to "Goal Box." This transition of feature quantities is recognized as the transition of a corner kick based on what has been learned from various images of previous soccer matches (e.g., based on the statistical model of layer 2 in FIG. 37, to be described later). The recognition has led to detection of the highlight. The meanings of the feature quantities such as "Upper Corner" will be described later in reference to FIG. 42.

As another example, FIG. 11 shows how a highlight is detected from the manner in which shot types make transition as chronological features between shots. In this example, the shot types are seen effecting transition from "Close-up" to "Medium" to "Long Shot." to "Close-up." The transition between, shots is recognized as the transition of a corner kick based on what, has been learned from various images of previous soccer matches (e.g., based on the statistical model of layer 1 in FIG. 37, to be described later). The recognition has led to detection of the highlight. The shot types such as "Long" will be discussed later in reference to FIG. 30.

In the preceding case, the highlight of the corner kick may be detected as per the recognition made in one of the examples of FIGS. 10 and 11, or in both examples. Alternatively, the highlight may be detected comprehensively from the two examples plus information derived from other sources.

The highlight detecting process will be discussed later in more detail by referring to FIGS. 37 through 44.

What follows is a detailed description of each of the component units ranging from the area-of-interest extraction unit 11 to the highlight detection unit IS making up the image processing apparatus of FIG. 1. The component units will be described individually in ascending order of their reference numerals. If the description calls for giving examples of a moving image content in order to facilitate the understanding of the present invention, soccer match images will be utilized as in FIGS. 3 through 11 discussed above.

The area-of-interest extraction unit 11 in the image processing apparatus of FIG. 1 will now be described in detail by referring to FIGS. 12 through 16.

Figure 12:
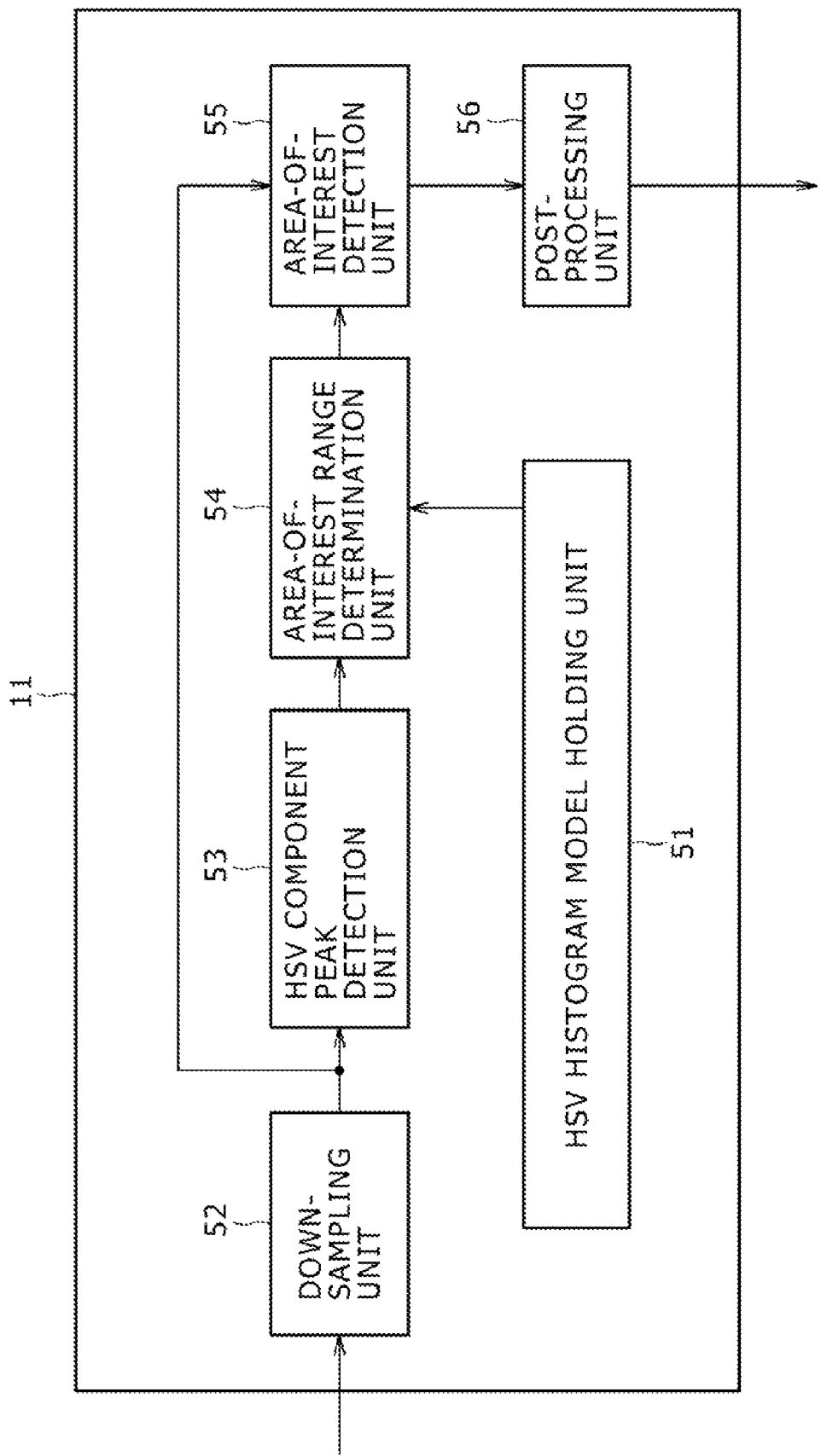
FIG. 12 is a functional block diagram showing a detailed functional structure of an area-of-interest extraction unit in FIG. 1.

FIG. 12 is a functional block diagram showing a detailed functional structure of the area-of-interest extraction unit 11.

In FIG. 12, the area-of-interest extraction unit 11 is structured to include component units ranging from an HSV histogram model holding unit 51 to a post-processing unit 56.

The HSV histogram model holding unit 51 holds an HSV histogram model that is used to detect the area of interest (i.e., playfield area for this embodiment) from the frame of interest in the case of this embodiment.

What follows is an explanation of the HSV histogram model.

Figure 13:
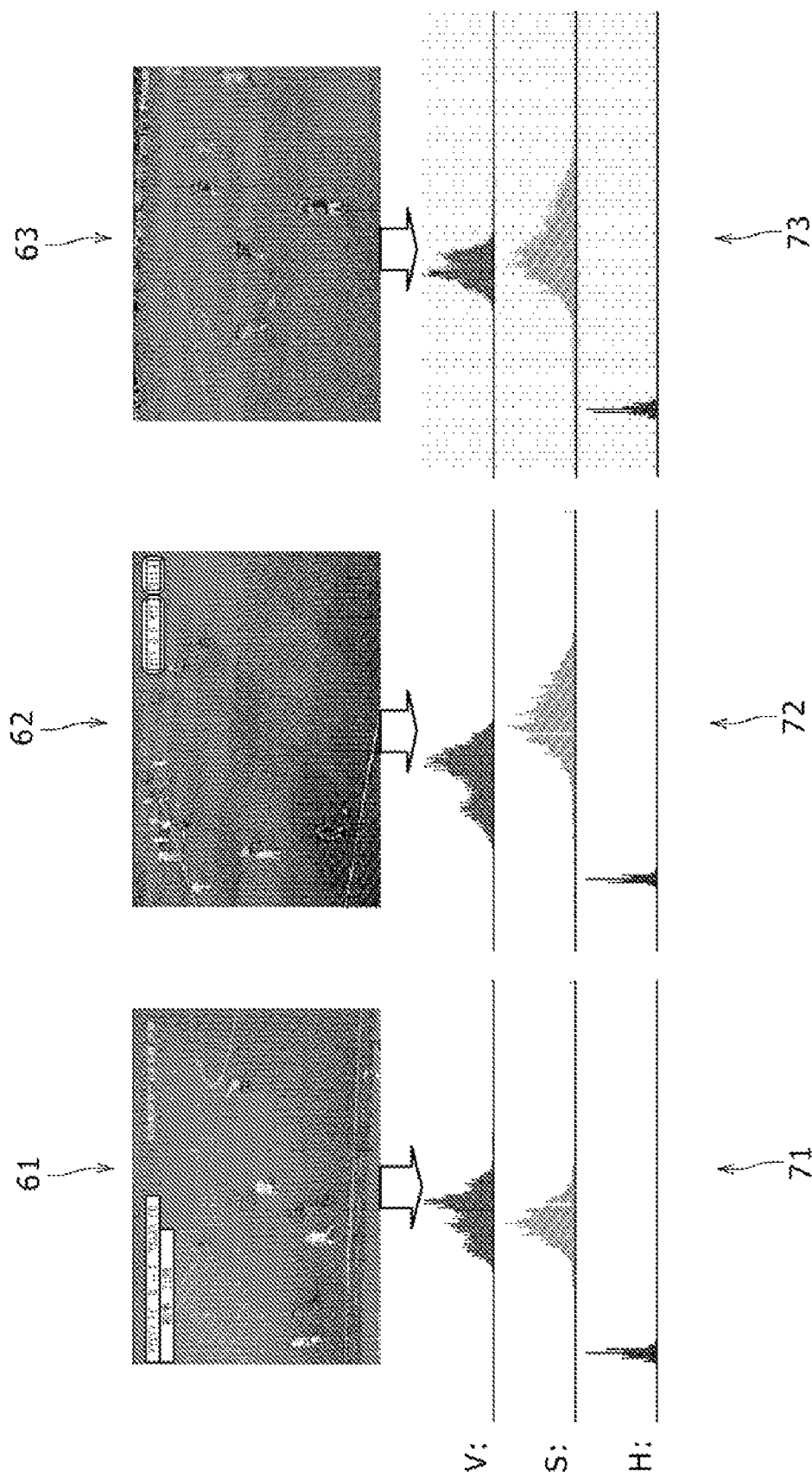
FIG. 13 is a schematic view explanatory of an HSV histogram model held by an HSV histogram model holding unit in FIG. 12.

FIG. 13 shows graphs 71 through 73 obtained, by projecting a 3D HSV (hue saturation value) histogram onto representative sample images 61 through 63 in each dimension, the images corresponding to a scene of a soccer match.

As can be seen from the graphs 31 through 73, the images of the soccer match contain much of the playfield area mainly composed of grass images. For this reason, the HSV histogram features (called the 3D RSV histogram features hereunder) of the images involved reveal a certain degree of relevance between their frames.

The inventors of the present invention analyzed the 3D HSV histogram features of numerous soccer match images such as the sample images 61 through 63 above in different time zones (e.g., daylight, evening, night) and under different weather conditions (e.g., sunny, cloudy, rainy). The analyses yielded some statistical findings that are outlined below.

The variable HSV ranges of the images covering the playfield area of interest were approximately H[22, 68], S[32, 255], and V[64, 175]. The maximum margins of the ranges were around H:16, S:123, and V:64. In other words, although the mean value of each of the H, S and V components in the images containing the playfield area varied, depending on the time zone and weather condition of soccer matches, the margin of variance of each component turned out to fall approximately within H:16, S:128, and V:64. Use of the HSV features including the margins of variance of the H, S and V components thus makes it possible to detect the playfield area in robust fashion.

With this embodiment of the present, invention, the margins of such variance are held by the HSV histogram model holding unit 51 in FIG. 12 as the HSV histogram model.

Figure 14:
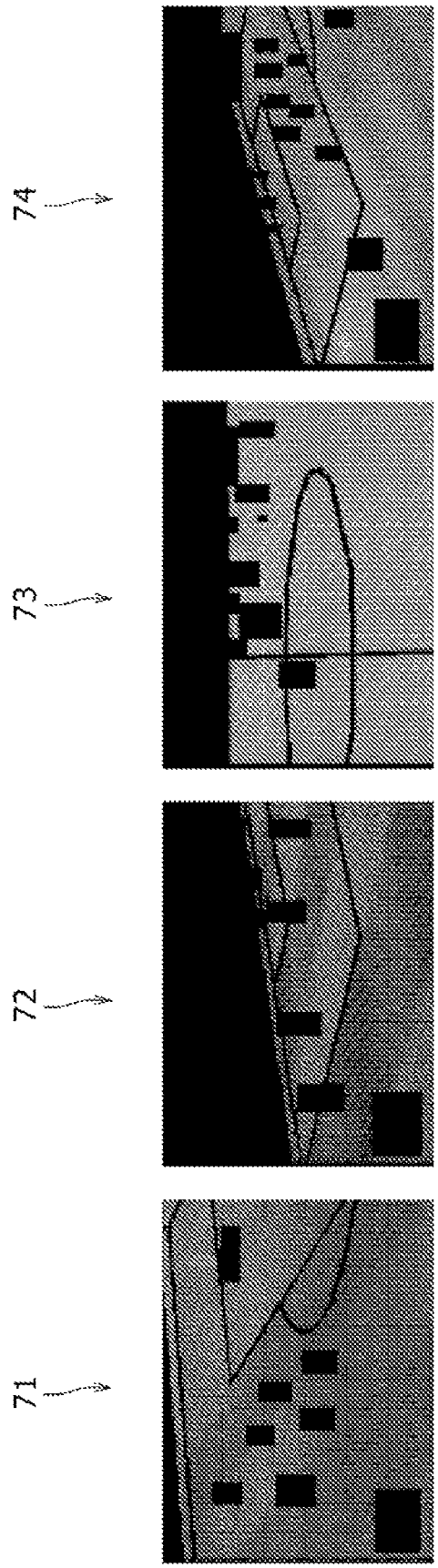
FIG. 14 is another schematic view explanatory of the HSV histogram model held by the HSV histogram model holding unit in FIG. 12.

As training-use sample images for acquiring such an HSV histogram model through learning, diverse images with visibly different color features such as images 71 through 74 shown in FIG. 14 may be adopted.

Returning to FIG. 12, a down-sampling unit 52 initially performs a first process for lowering the resolution of the frame of interest, then a second process for compressing the resolution of each of the H, S and V components from eight bits to two or three bits. The frame of interest thus processed is forwarded to an HSV component peak detection, unit 53 and an area-of-interest detection unit 55. The first process mainly involves boosting processing speed and reducing noise from inside the images. The second process principally involves enhancing the robustness of detection through reduction of the effects of illumination changes.

The HSV component peak detection unit 53 computes a 3D HSV histogram (e.g., graphs 71 through 73 in FIG. 13) of the frame of interest coming from the down-sampling unit 52. With the 3D HSV histogram computed, the HSV component peak detection unit 53 detects the peak of each of the H, S and V components and notifies an area-of-interest range determination unit 54 of the detected peaks as the center values (mean values) of the respective components.

Given the center values (mean values) of the H, S and V components, the area-of-interest range determination unit 54 determines the range of each of the H, S and V components in such a manner that their respective margins of variance correspond to those of the HSV histogram model held by the HSV histogram model holding unit 51. The area-of-interest range determination unit 54 notifies the area-of-interest detection unit 55 of what has thus been determined as the ranges of the area of interest.

More specifically, the HSV histogram model holding unit 51 of this embodiment holds the HSV histogram model having "16," "128" and "64" as the margins of the H, S and V component ranges, respectively. Therefore the area-of-interest detection unit 55 is supplied with the range of the H component having the margin of 16 around its center value (i.e., peak of the H component), the range of the S component having the margin of around its center value (peak of the S component), and the range of the V component, having the margin of 64 around its center value (peak of the V component). The ranges thus supplied constitute the ranges of the area of interest.

The area-of-interest detection unit 55 detects the area of interest (i.e., playfield area in the case of this embodiment) by processing each of the pixels (called the pixel of interest hereunder) making up the frame of interest coming from the down-sampling unit 52. The process is carried out on each pixel of interest illustratively as follows:

The area-of-interest detection unit 55 checks to determine whether the H, S and V components of the pixel of interest are included in the area-of-interest range communicated from the area-of-interest range determination unit 54. If the components are found included in the range, then the pixel of interest is detected as one of the pixels making up the playfield area. If the components are not found included, then the pixel of interest is detected as a pixel, outside the playfield area.

Figure 15:
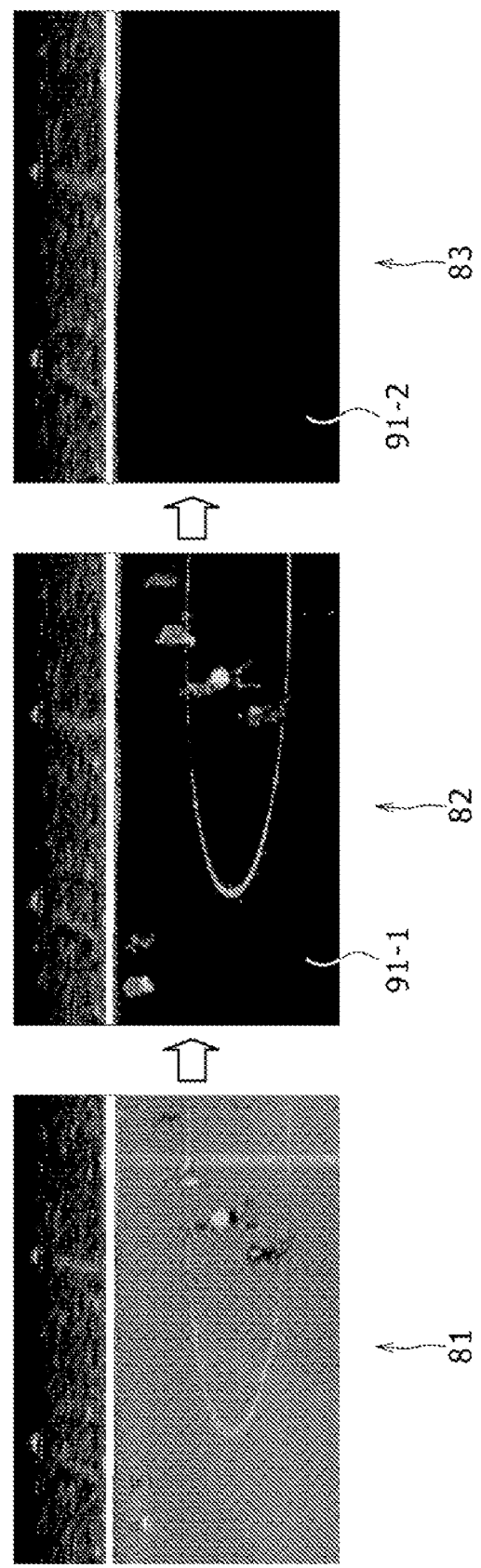
FIG. 15 is a schematic view showing a typical result of processing by the area-of-interest extraction unit in FIG. 12.
Figure 16:
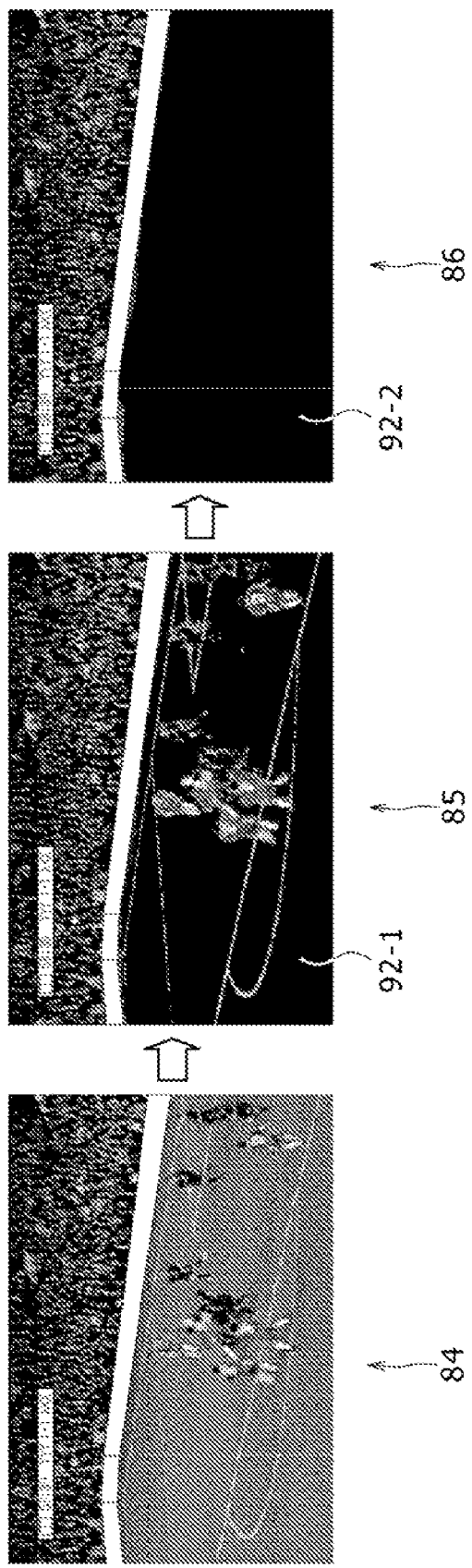
FIG. 16 is a schematic view showing another typical result of processing by the area-of-interest extraction unit in FIG. 12.

In the example of FIG. 15, an image 81 is the frame of interest. When the playfield area is detected, an image 82 is obtained. That is, a black area 91-1 in the image 82 is extracted as the playfield area. Similarly, in the example of FIG. 16, an image 84 is the frame of interest. With the playfield area detected, an image 85 is acquired. That is, a black area 92-1 in the image 85 is extracted as the playfield area.

The frame of interest, from which the playfield area is detected as described above, is forwarded from the area-of-interest detection unit 55 to the post-processing unit 56 in FIG. 12.

In turn, the post-processing unit 56 performs post-processing on the frame of interest by removing straight lines and other objects from inside the playfield area through filtering for noise removal. In other words, it may be said that the post-processing unit 56 rechecks to determine whether the pixel found earlier to be outside the playfield area by the area-of-interest detection unit 55 actually fails within the playfield area.

In the example of FIG. 15, the post-processing performed on the image 82 has produced an image 83. That is, with white lines and players filtered out from the area 91-1, a black area 91-2 in the image 83 forms the noise-free playfield area. Likewise, in the example of FIG. 16, the post-processing carried out on the image S3 has given an image 86. That is, when white lines and players are filtered out from the area 92-1, a black area 92-2 in the image 86 makes up the noise-free playfield area.

As described, the area-of-interest extraction unit 11 in FIG. 12 detects the image area having the grass color in a real-world soccer playfield through the use of color distribution features obtained by learning diverse soccer match images, i.e., the HSV histogram model held by the HSV histogram model holding unit 51. With the playfield area thus detected in real time in a robust manner, the area-of-interest extraction unit 11 can automatically analyze the ongoing soccer match.

The playfield area, as mentioned above, is merely an example of the area of interest when soccer match images are utilized as the moving image content. Any other image area containing the color of interest corresponding to the moving image content having been adopted may be used as the area of interest. Thus when the area of interest is detected from a moving image content of a given type, an HSV histogram model suitable for the type may be created by learning various images of that, moving image content type. The HSV histogram model may then be retained by the HSV histogram model holding unit 51. In this case, too, when another moving image content of the type in question, is input to the area-of-interest extraction unit 11, the area of interest, corresponding to that type is detected likewise in real time in a robust manner. Moving image contents of the type in question can thus be analyzed automatically.

As will be discussed later, once the area of interest is extracted, it is easy to extract object features from inside the area of interest or from adjacent areas. This makes it possible automatically to furnish meta information when an ongoing moving image content of any one of diverse types such as sports is being analyzed.

As will also be described later, once the object features are extracted from inside the area of interest and from its adjacent areas, it is possible to detect and classify shots with high precision during image analysis. Ultimately, it is possible automatically to extract highlights and create digest images from the moving image content.

The foregoing detailed description with reference to FIGS. 12 through 16 was about how the area-of-interest extraction unit 11 works as a component unit of the image processing apparatus in FIG. 1.

Described below in detail with reference to FIGS. 17 through 27 is the object feature extraction unit 12 as another component of the image processing apparatus in FIG. 1. Some concrete examples will be discussed below regarding what object features can be extracted by the object feature extraction unit 12 from the moving image content of a soccer match and how these features are extracted.

Figure 17:
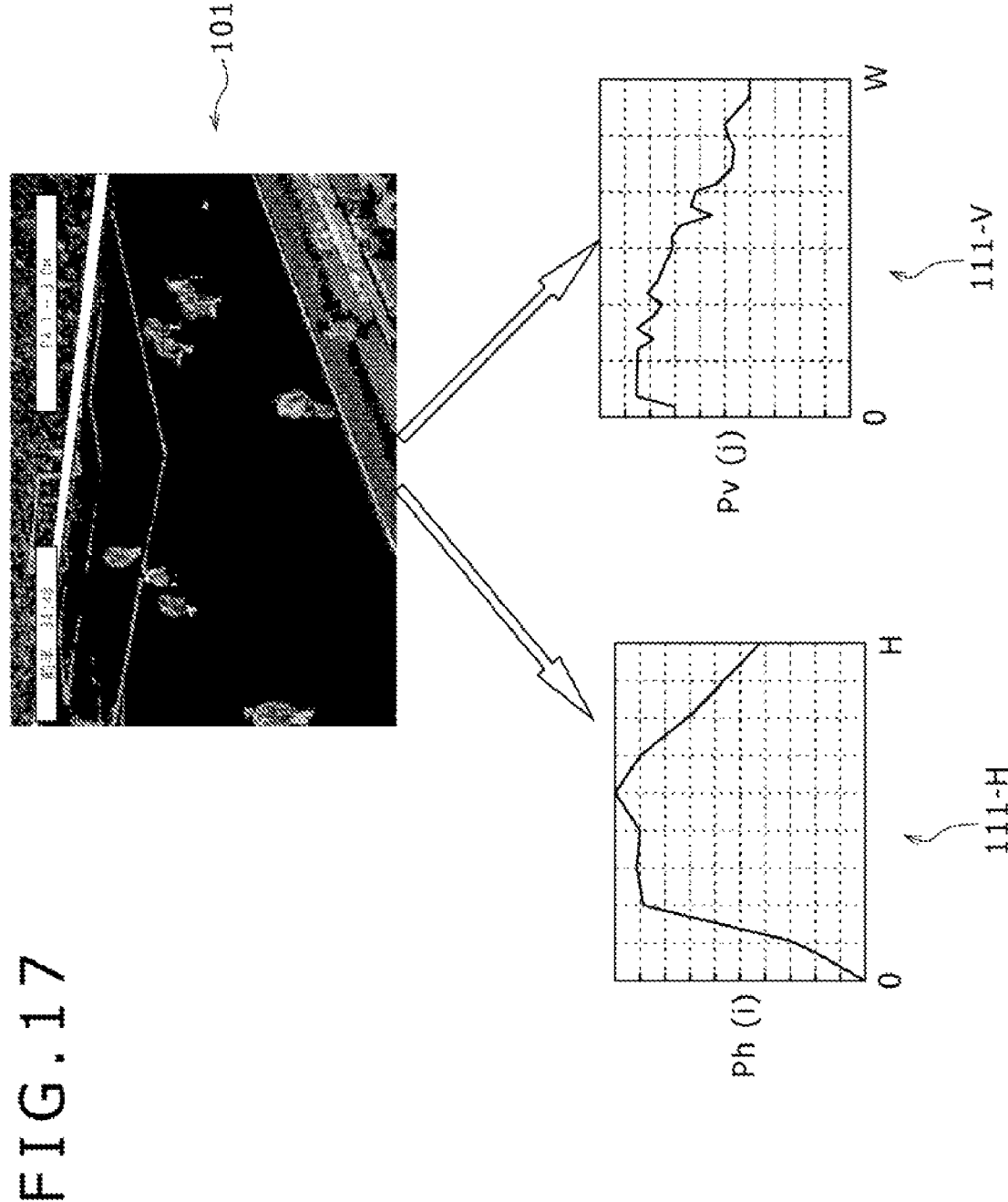
FIG. 17 is a schematic view explanatory of what object feature is extracted by an object feature extraction unit in FIG. 1 and how it is extracted.

FIG. 17 is a schematic view showing there exist objects inside the playfield area in the frame of interest. The objects are different in size, so that they occupy different portions of the playfield area. The differences are extracted illustratively as representative of an object feature, as described below.

Suppose that a pixel $M(i, j)$ corresponds to the playfield, forms part of the playfield area in the frame of interest, and is represented by the following expression (1):

$$M(i,j) i \in \{1, 2, \ldots, H\}, j \in \{1, 2, \ldots, W\} \quad (1)$$

The pixel M(i, j) corresponding to the playfield is a pixel detected by the area-of-interest detection unit 55 in FIG. 12 as part of the playfield area, i.e., a pixel in effect before such objects as players and the ball are removed through post-processing by the post-processing unit 56. In other words, of the pixels constituting the playfield area, those minus such objects as the players and the ball in the playfield area are expressed as M(I, j). That is, the pixels having the color feature of the real-world playfield (i.e., grass) are represented by M(I, j). More specifically, the black pixels inside the playfield area 91-1 in FIG. 15 and the black pixels inside the playfield area 92-1 in FIG. 16 correspond to the pixels M(I, J).

In the expression (1) above, reference characters H and W stand respectively for the size in the vertical direction (Y direction) and for the sire in the horizontal direction (X direction) in the frame of interest.

In this case, feature quantities indicative of the features of objects in varying sizes (called the projection feature quantities hereunder) may be represented by a vertical projection feature quantities Ph(i) and horizontal projection feature quantities Pv(j) in the following (2):

$$P_h(i) = \frac{1}{W} \sum_{j=1}^{W} M(i,j) \quad P_v(j) = \frac{1}{H} \sum_{i=1}^{H} M(i,j) \quad (2)$$

Illustratively, FIG. 17 shows two graphs 111-H and 111-V in effect when an image 101 is adopted as the frame of interest. The graph 111-H depicts transition of the vertical projection feature quantities Ph(i), and the graph 111-V plots transition of the horizontal projection feature quantities Pv)j).

As will be discussed later in more detail with reference to FIG. 32 and related drawings, if the horizontal projection feature quantities Pv(j) change significantly as opposed to the vertical projection feature quantities Ph(i) making not much change, that means there exist large objects inside the playfield area, such as the players photographed as big-sized objects. Conversely, if the horizontal projection feature quantities Pv(j) hardly change or if the vertical projection feature quantities Ph(i) change significantly, that means there exist small objects inside the playfield area, such as the players pictured as small-sized objects.

As described, the object feature extraction unit 12 computes the vertical projection feature quantities Ph(i) and horizontal projection feature quantities Pv(j) regarding the frame of interest. Depending on how the vertical projection feature quantities Ph(i) and horizontal projection feature quantities Pv(j) change, the object feature extraction unit 12 extracts as an object feature the varying sizes of the objects that exist in the playfield area.

Figure 18:
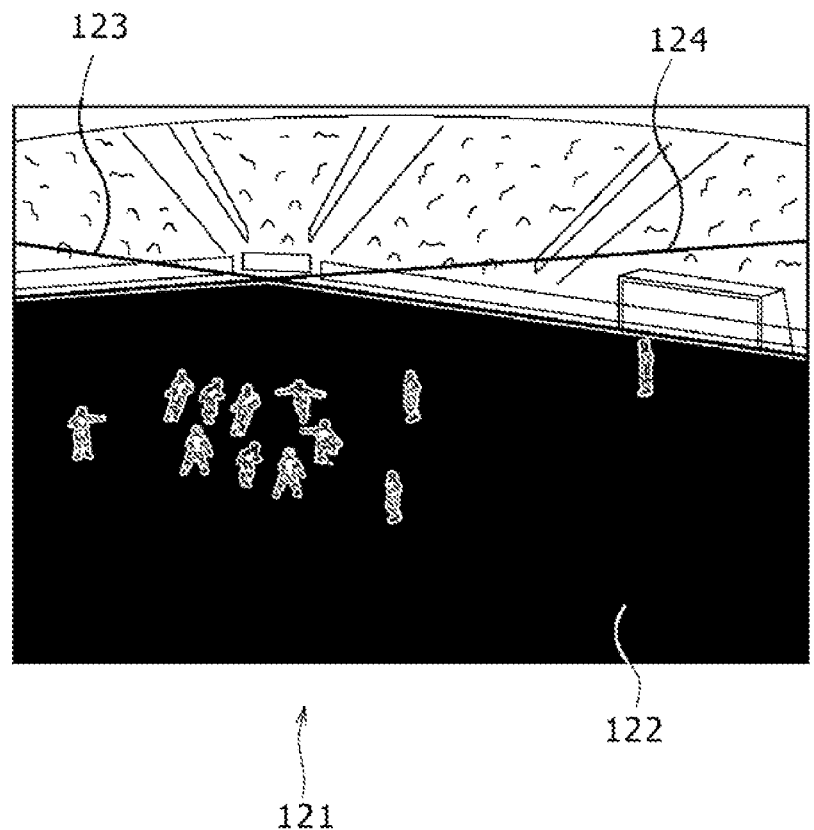
FIG. 18 is another schematic view explanatory of what object feature is extracted by the object feature extraction unit in FIG. 1 and how it is extracted.

FIG. 18 is a schematic view showing how a boundary or boundaries between the playfield area and other areas in the frame of interest, or information about these boundaries such as the angle and the point of interest between them, may be extracted as an object feature.

FIG. 18 shows an example in which straight lines 123 and 124 are extracted as a boundary of a black playfield area 122 from an image 121 adopted as the frame of interest. The object feature extraction unit 12 detects in increments of pixels the boundary of the playfield area inside the frame of interest. The positions of the boundary thus detected may be represented by B(i) in the following expression (3):

$$B(i), i \in \{1, 2, \ldots, W\}, B(i) \in \{1, 2, \ldots, H\} \quad (3)$$

The boundary positions B(i) in the expression (3) above denote the positions of W pixels in the horizontal direction. The object feature extraction unit 12 then performs a process for reducing horizontal-direction resolution into 30 divisions. That is, the number of boundary positions B(i) in the horizontal direction is reduced to 30. The object feature extraction unit 12 proceeds to find boundary angles A(i) at the boundary positions B(i), i.e., the angle A(i) between each position B(i) on the one hand and a straight line connecting positions B(i−1) and B(i+1) immediately before and after the position B(i) in question on the other hand. The reduction of resolution is aimed at lowering undesired effects (i.e., noise) such as people or graphic elements coming into contact with the boundary. If such people or graphic elements are found contiguous to the boundary positions B(i), they are removed for noise reduction purposes.

Thereafter, the object feature extraction unit 12 finds an angle Al(n) of "n" left-side positions and an angle Ar(n) of "n" right-side positions (n is an integer between 1 and 30) out of the 30 horizontal division, the angles Al(n) and Ar(n) being computed using the following expressions (4) and (5) respectively:

$$A_l(n) = \text{median}\{A(1), \ldots, A(n)\} \quad (4)$$

$$A_r(n) = \text{median}\{A(n+1), \ldots, A(30)\} \quad (5)$$

The object feature extraction unit 12 further computes variances Dl(n) and Dr(n) for the left-side and right-side angles, respectively, using the following expressions (6) and (7):

$$D_l(n) = \left\{ \frac{1}{n} \sum_{i=1}^{n} [A(i) - A_l(n)]^2 \right\}^{1/2} \quad (6)$$

$$D_r(n) = \left\{ \frac{1}{30-n} \sum_{i=n+1}^{30} [A(i) - A_r(n)]^2 \right\}^{1/2} \quad (7)$$

The object feature extraction unit 12 regards the pixel position N given by the following expression (8) as the point of intersection between the left-side and right-side straight lines:

$$N = \arg\min_n \{[D_l(n) + D_r(n)]/[A_l(n) - A_r(n)]\} \quad (8)$$

Finally, if a difference of at least 10 degrees is found between the left-side and right-side angles Al(n) and Ar(n) at the pixel position H (i.e., as in the case of the expression (9) below), then the object feature extraction unit 12 detects those straight lines having the left-side and right-side angles Al(n) and Ar(n) as two different boundaries. In the example of FIG. 18, the straight lines 123 and 124 are detected as two boundaries. If the angular difference between the left-side and right-side angles Al(n) and Ar(n) at the pixel position M is less than 10 degrees, then the two lines are regarded as a single boundary. The expression (9) is given as follows:

$$A_l(N) - A_r(N) \sim \text{Threshold}(10°) \quad (9)$$

Alternatively, when two boundaries are detected, the point of intersection between them may be detected as a corner position in the soccer field, as will be discussed later in reference to FIG. 21.

The object, feature extraction unit 12 can, as described above, extract, as an object, feature the boundary or boundaries between the playfield area and adjacent areas from inside the frame of interest, or information about, such boundaries such as the angle or the point of intersection between these boundaries.

In another example, the object feature extraction unit 12 may extract as another object feature the goal (otherwise called the goal gate or goal box) in the soccer field, following detection of the boundary or boundaries of the playfield. The extraction is carried cut as follows:

The object feature extraction unit 12 first detects approximately vertical white lines in contact with the boundaries inside the frame of interest. The term "approximately vertical" refers to the fact that the apparently vertical portions of the white structure (e.g., steel bars) at the real-world goal gate are not necessarily truly vertical in the frame of interest. That is, the object feature extraction unit 12 detects white lines which, are contiguous to the boundaries and which have a left-side or right-side angle α of tolerance (α is any angle between 0 and 90 degrees) relative to the true vertical direction inside the frame of interest. The term "white lines" refers not to true white lines but lines composed of the color regarded as substantially or approximately white.

When at least two substantially vertical white lines are detected, the object feature extraction unit 12 selects a pair (i.e., two) of these at least two white lines and checks to determine whether there exists any substantially horizontal white line within the area enclosed by the selected pair of white lines. The term "substantially horizontal" has the same connotations as the term "substantially vertical," referring to the fact that the apparently horizontal line may only be approximately horizontal and need not be truly horizontal. The object, feature extraction unit 12 performs the check on all possible pairs of lines out of the substantially vertical white lines. On detecting at least one pair of white lines between which an approximately horizontal white line is found, the object feature extraction unit 12 regards that pair as a goal gate candidate.

Figure 19:
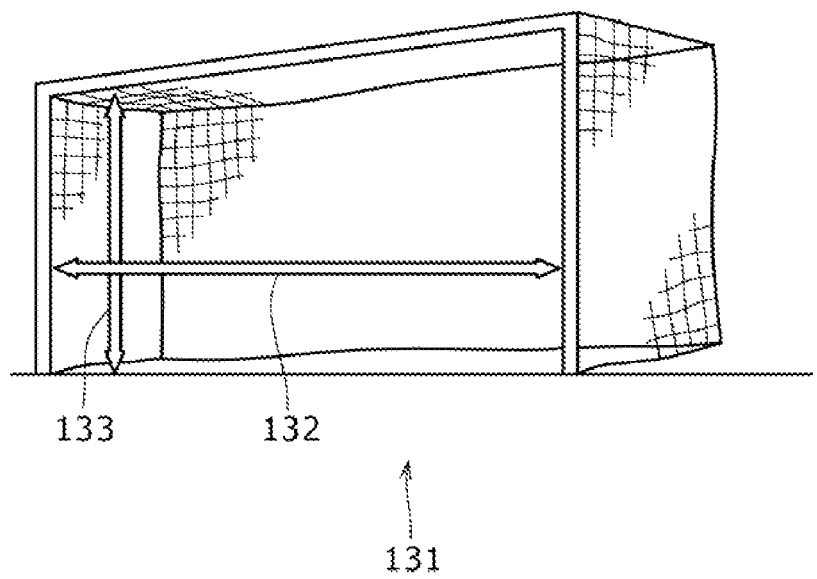
FIG. 19 is another schematic view explanatory of what, object feature is extracted by the object, feature extraction unit in FIG. 1 and how it is extracted.

The object feature extraction unit 12 then extracts the correct goal gate through the use of the relations between a post height 133 and a cross bar length 132 in a goal gate shown in FIG. 19, and of the predefined proportions in size between the cross bar length 132 and the play field width (i.e., semantic rules for the goal gate). That is, the object feature extraction unit 12 selects from at least one gate goal candidate the candidate that meets the semantic rules as the goal gate.

FIG. 20 shows a typical goal gate detected by the method described above. More specifically, FIG. 20 gives an example in which, with an image 141 adopted as the frame of interest, an area 144 is extracted as the goal gate enclosed by two substantially vertical white lines and by one approximately horizontal white line, the two vertical lines being contiguous to the boundary of a black playfield area 143. It can be seen from FIG. 20 that although the image 141 has a complicated background, the goal gate 144 is detected in robust fashion.

Figure 21:
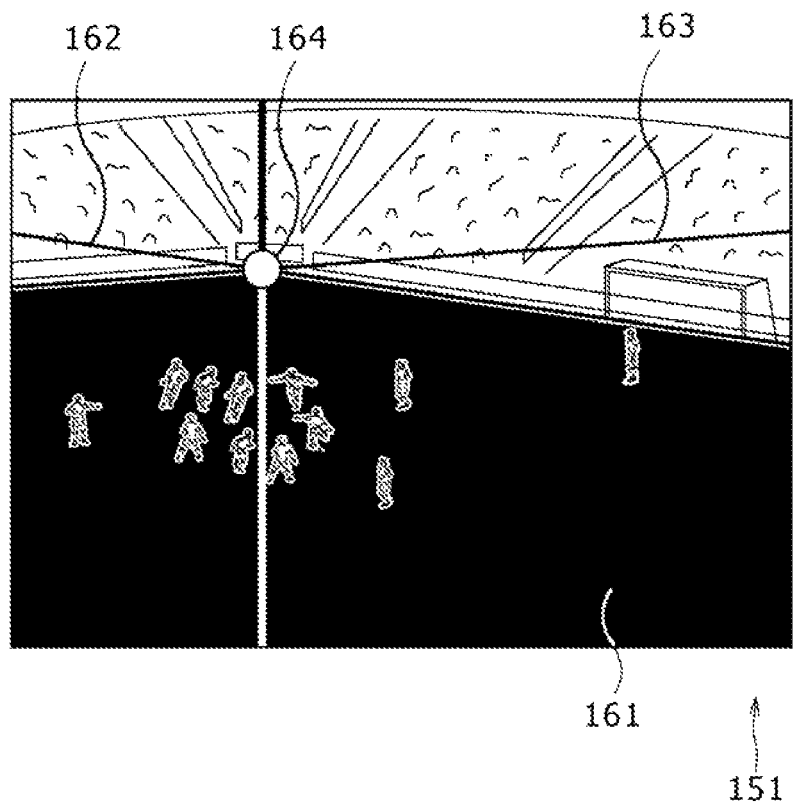
FIG. 21 is another schematic view explanatory of what object feature is extracted by the object feature extraction unit in FIG. 1 and how it is extracted.

FIG. 21 schematically shows how a corner position is extracted as an object feature from the playfield area in the frame of interest.

More specifically, FIG. 21 gives an example in which, with an image 151 adopted as the frame of interest, a point of intersection 164 between two boundaries 162 and 163 of a black playfield area 161 is shown extracted as the corner position.

The method for detecting the corner position is basically the same as the method for detecting boundaries explained above in reference to FIG. 1S. That is, the object feature extraction unit 12 may extract the corner position as one object feature by applying the expressions (3) through (9) above to the frame of interest.

More specific ways of extracting the object feature are commonly known and thus will not be discussed further. It may be noted simply that known techniques are usable by the object feature extraction unit 12 in extracting diverse object features.

FIGS. 22 through 27 show illustratively how object features are extracted.

Figure 22:
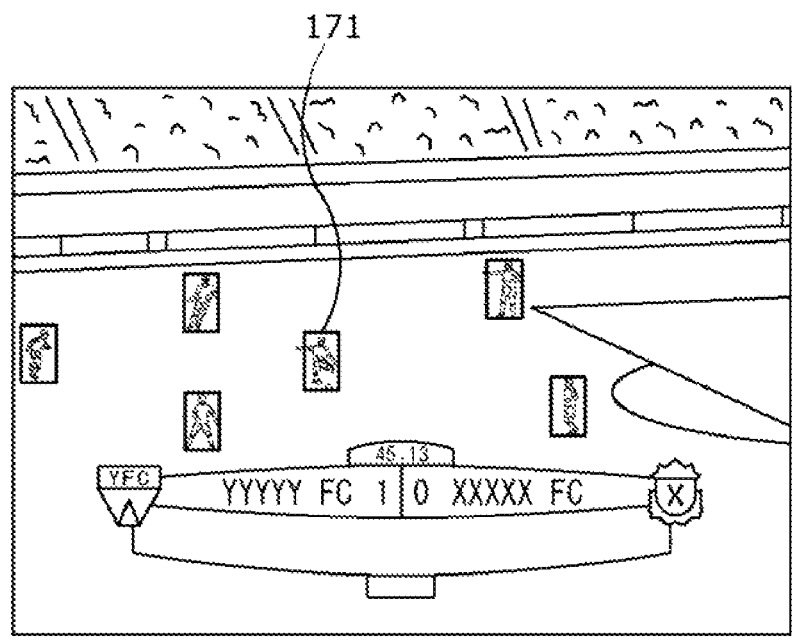
FIG. 22 is another schematic view explanatory of what, object feature is extracted by the object, feature extraction unit in FIG. 1 and how it is extracted.
Figure 23:
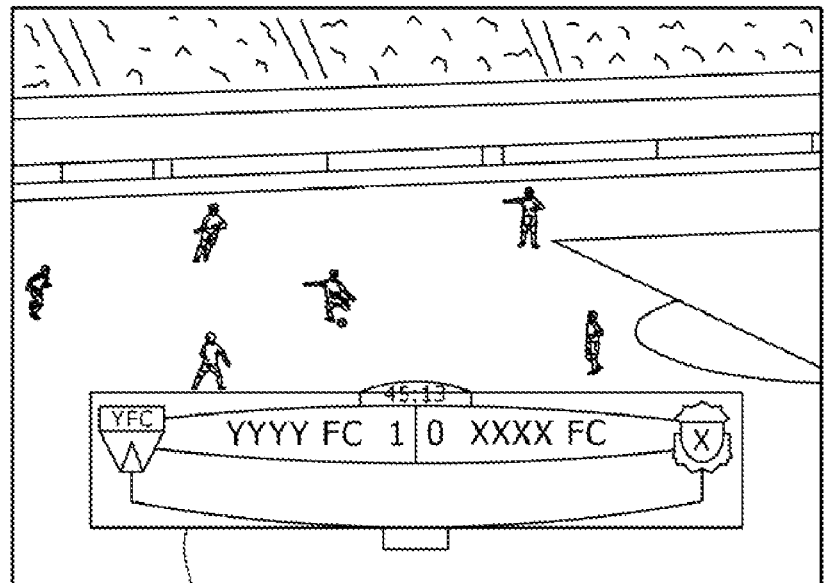
FIG. 23 is another schematic view explanatory of what object feature is extracted by the object feature extraction unit in FIG. 1 and how it is extracted.
Figure 24:
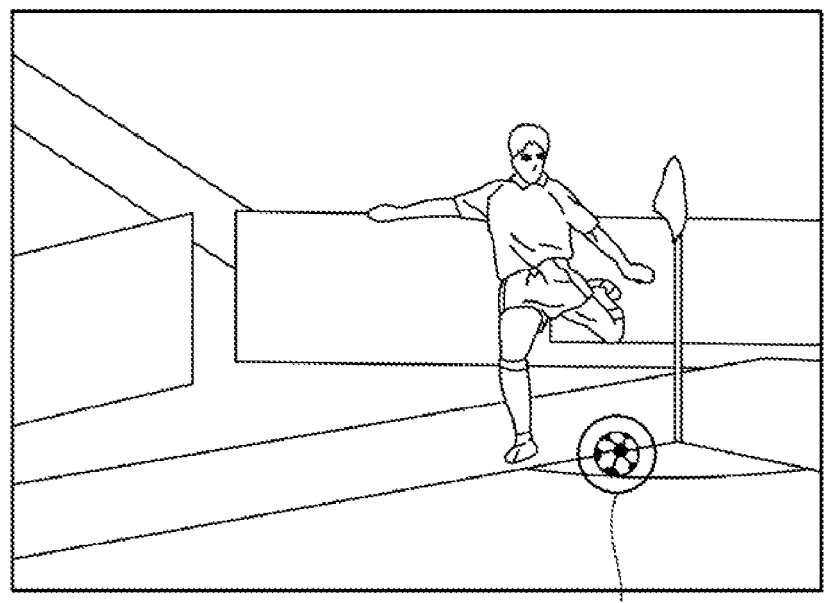
FIG. 24 is another schematic view explanatory of what object feature is extracted by the object feature extraction unit in FIG. 1 and how it is extracted.
Figure 25:
FIG. 25 is another schematic view explanatory of what object feature is extracted by the object feature extraction unit in FIG. 1 and how it is extracted.
Figure 26:
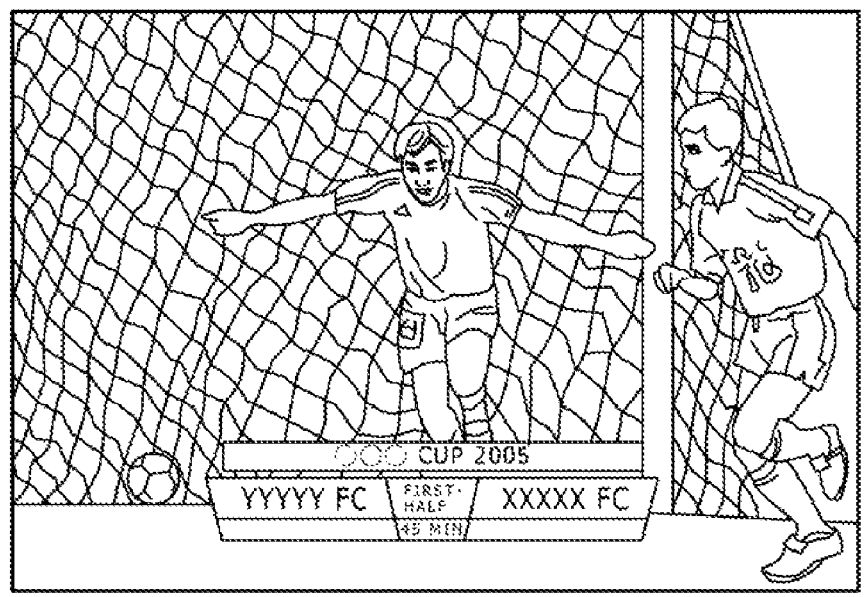
FIG. 26 is another schematic view explanatory of what object feature is extracted by the object feature extraction unit in FIG. 1 and how it is extracted.
Figure 27:
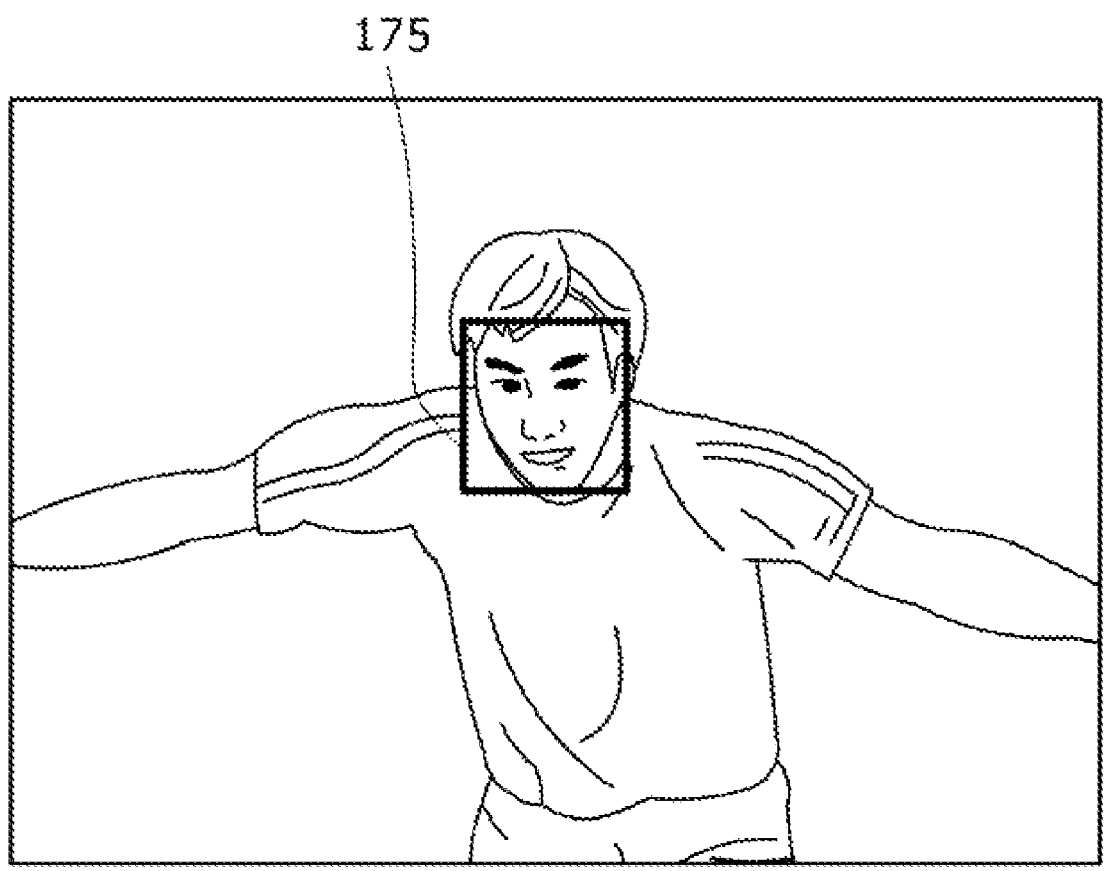
FIG. 27 is another schematic view explanatory of what object feature is extracted by the object feature extraction unit in FIG. 1 and how it is extracted.

In the example of FIG. 22, players 171 in the playfield area are extracted as an object feature. In the example of FIG. 23, a graphic area 172 superposed on the playfield with score points and other indications is extracted as an object feature. In the example of FIG. 24, the bail 173 in the playfield area is extracted as an object feature. In the example of FIG. 25, not players bat the referee 174 is extracted as an object feature by taking advantage of the difference in color between the players' and the referee's clothes. In the example of FIG. 26, the movement of the players in the playfield area such as the running of the players at a given speed in a given direction is extracted as an object feature. In the example of FIG. 27, a player's face 175 is extracted as an object feature.

The foregoing description in reference to FIGS. 17 through 27 was about how the object feature extraction unit 12 works as a component, unit of the image processing apparatus in FIG. 1.

Figure 28:
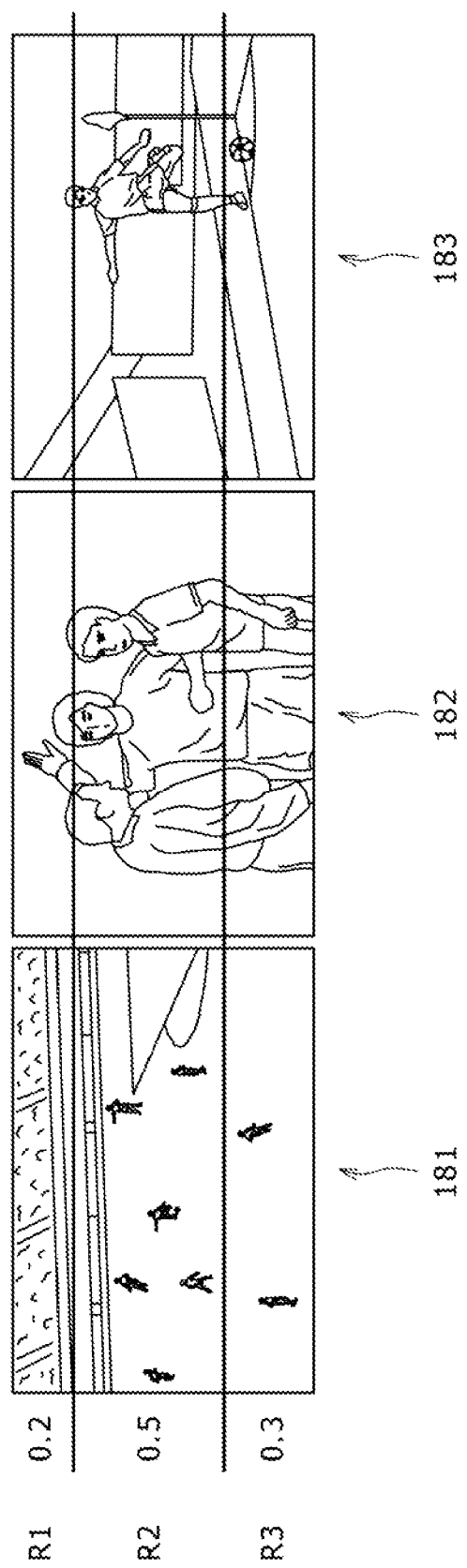
FIG. 28 is a schematic view explanatory of how shot cuts are detected by a shot cut detection unit in FIG. 1.
Figure 29:
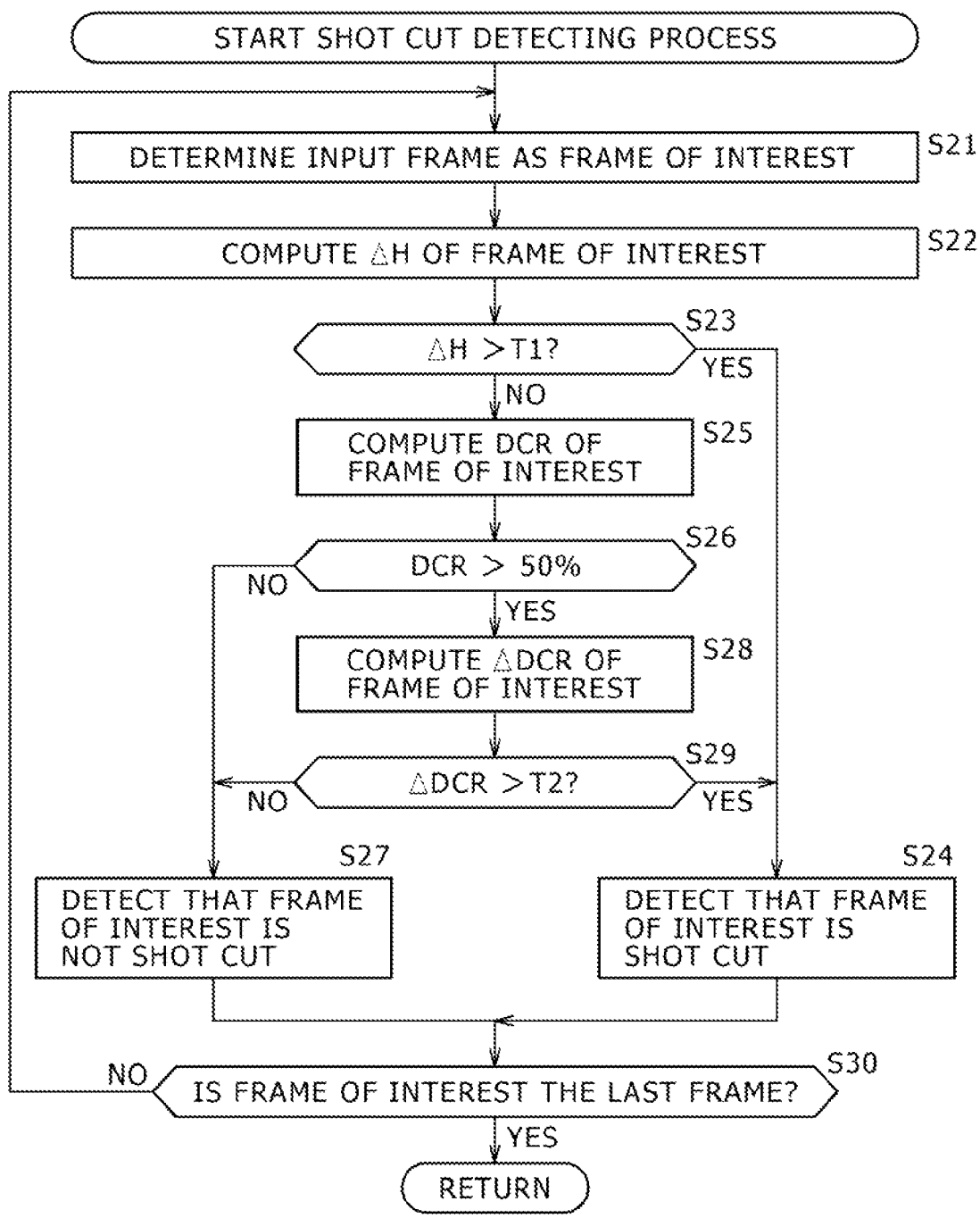
FIG. 29 is a flowchart of detailed steps constituting a shot cut detecting process in step S3 of FIG. 2, the process being performed by the shot cut detection unit in FIG. 1.

Described below in detail with reference to FIGS. 28 and 29 is the shot cut detection unit 13 as another component of the image processing apparatus in FIG. 1.

A shot cut refers to a switchover from one shot to another (i.e. a shot change). Shot cuts generally fail into three categories: hard cuts, fade-in/fade-out cuts, and graphics wiper cuts. The shot change of a hard cut is easy to detect because it involves shots changing merely in one or two frames. The snot change of a fade-in/fade-out cut or a graphics wiper cut, on the other hand, is not easy to detect automatically because the shots change in as many as 10 to 30 frames.

The inventors of the present invention came up with the shot cut detecting method described below for detecting not only hard cuts but also fade-in/fade-out cuts and graphics wiper cuts easily and accurately.

In the inventors' view, two condition need to be met simultaneously for easy and accurate detection of shot outs. The first condition is that robustness should be maintained despite the movements of cameras and of objects within the frame. The second condition is that changes in color feature distribution in the frame should be detected sensitively.

Also in the inventors' view, the first and the second conditions above may be met by carrying out suitable computations on at least two image areas divided in the predominant direction of the movements of objects in the frame.

The predominant direction of the objects moving inside the frame may well be its horizontal direction if the moving image content is a soccer match as in the case of this embodiment. The reason for deciding on this direction is that the objects of the soccer match are primarily the players and the ball that mostly move horizontally within the frame.

More specifically, as shown in FIG. 28, it is assumed that in each of frames 181 through 183, the image area is divided horizontally into three portions in the ratio 2:5:3 from the top down and that these image portions are subject to the computations to be described below. It is also assumed that the three image areas divided in the ratio 2:5:3 will be represented by reference characters R1, R2 and R3, respectively, as depicted in FIG. 28.

The reason for the division in the ratio 2:5:3 is that comprehensive analyses of diverse frames constituting soccer match scenes revealed a particular image area filled mostly with the playfield area. That area is the area R2 out of the three divided image areas. Still, the ratio 2:5:3 or even the divided area count being three is not imperative. These are merely examples that may be changed in keeping with the type of the moving image content from which to detect shot cuts.

Initially, the shot cut detection unit 13 may divide the frame of interest into three areas R1 through R3 as explained above.

The shot cut detection unit 13 then computes the above-described 3D HSV histogram (see graphs 71 through 73 in FIG. 13) as the color feature distribution regarding each of the areas R1 through R3 in the frame of interest. In order to improve robustness of detection against noises in the frame, the shot cut detection unit 13 expresses each of the H, S and V components of the 3D HSV histogram in two bits. The six-bit data made up of the three components in two bits each is created as a feature quantity indicative of color feature distribution. The feature quantity will be referred to as the color feature quantity HRk in the ensuing description, where "k" stands for 1, 2 or 3. That is, HR1 stands for the color feature quantity of the area R1, HR2 for the color feature quantity of the area R2, and HR3 for the color feature quantity of the area R3.

The snot cut detection unit 13 proceeds to compute a feature quantity ΔHk of each of the areas R1 through H3 in the frame of interest using the expression (10) shown below, the feature quantity being a feature indicative of the difference between frames. The feature quantity ΔHk will be referred to as the color difference feature quantity ΔHk in the ensuing description. The expression (10) is as follows:

$$\Delta H_{Rk} = \sum_{i=0}^{63} |H_{tk}(i) - H_{tk-\Delta}(i)|/2 \sum_{i=0}^{63} H_{tk}(i) \qquad (10)$$

where, Htk(i) stands for the color feature quantity of the area "k" in the frame of interest, and Htk−Δ(i) represents the color feature quantity of the area "k" in the frame a number of frame intervals earlier than the frame of interest. Reference character Δ denotes a constant indicative of that number of frame intervals earlier than the frame of interest.

The computations above provide the color difference feature quantity ΔHR1 of the area R1, the color difference feature quantity ΔHP2 of the area R2, and the color difference feature quantity ΔHP3 of the area R3.

The shot cut detection unit 13 uses the expression (11) below to compute the color difference feature quantity ΔH of the entire frame. The color difference feature quantity ΔH will be referred to as the overall color difference feature quantity ΔH in the ensuing description. The expression (11) is as follows:

$$\Delta H = \alpha * \Delta H_{R1} + \beta * \Delta H_{R2} + \gamma * \Delta H_{R3} \qquad (11)$$

where, reference character α is a parameter value for weighting the color difference feature quantity ΔHR1 of the area R1; β denotes a parameter value for weighting the color difference feature quantity ΔHR2 of the area R2; and γ represents a parameter value weighting the color difference feature quantity ΔHR3 of the area R3. Although the parameters α, β and γ are not limited to any specific values, the parameter β may preferably be the largest of the three values in the case of a soccer match as with this embodiment. Since the area R2 is most often occupied by the playfield area as discussed above, this is the most important area for detecting shot cuts. It is thus appropriate to give the largest weight, to the area R2.

The shot cut detection unit 13 compares the overall color difference feature quantity ΔH with a predetermined threshold value T1. If the overall color difference feature quantity ΔH is found larger than the threshold value T1 (i.e., ΔH>T1), then the shot cut detection unit 13 determines that the frame of interest is a shot cut. The threshold value T1, not limited to any specific level, may preferably be acquired statistically from past soccer match images.

The above-described series of processes performed by the shot cut detection unit 13 constitutes one shot cut detecting method devised by the inventors. This method will be referred to as the overall color feature difference shot cut detecting method in the ensuing description.

The inventors of the present invention also came up with another shot cut detecting method, to be described below.

From sport-related images such as a soccer match broadcast, it is possible to extract shot cuts more robustly by taking advantage of features in the area of interest. The area of interest for a soccer match is the playfield area that appears most often in the area R2 as discussed above.

The shot cut detection may be carried out by utilizing the feature of what may be called the color of interest in the area R2. The color of interest refers to the predominant color in the area of interest. Where the area of interest is the playfield area, the color of the grass (i.e., green in this case) is the color of interest. In other words, the color of interest constitutes an area corresponding to the real-world grass in the playfield area in effect prior to post-processing by the post-processing unit 56 in FIG. 12, i.e., an area free of such objects as players, the ball, and white lines.

More specifically, the shot cut detection unit 13 computes the proportion of the area of the color of interest in the area R2, i.e., the ratio of the number of pixels making up the color of interest, to the total number of pixels constituting the area R2. The ratio will be referred to as the color-of-interest ratio DCR in the ensuing description.

The shot cat detection unit 13 then checks to determine whether the color-of-interest ratio DCR exceeds 50 percent. If the color-of-interest ratio DCR is found to exceed 50 percent, the shot cut detection unit 13 detects the possibility of a shot cut and proceeds to carry out the expression (12) shown below. The expression (12) is used to compute a feature quantity ΔDCR as one feature indicative of the difference between frames. The feature quantity ΔDCR will be referred to as the color-of-interest difference feature quantity ΔDCR in the ensuing description. The expression (12) is as follows;

$$\Delta DCR = |DCR_t - DCR_{t-\Delta}|/DCR_t \qquad (12)$$

where, DCRt(i) denotes the color-of-interest ratio of the frame of interest, and DCRt−Δ represents the color-of-interest ratio of the frame a number of frame intervals earlier than the frame of interest. Reference character A denotes a constant indicative of that number of frame intervals earlier than the frame of interest, as in the case of the expression (10) above.

The shot cut detection unit 13 compares the color-of-interest difference feature quantity ΔDCR with a predetermined threshold value T2. If the color-of-interest difference feature quantity ΔDCR is found larger than the threshold value T2 (i.e., ΔDCR>T2), then the shot cut detection unit 13 detects that the frame of interest is a shot cut. The threshold value T2, not limited to any specific level, may preferably be acquired statistically from past soccer match images.

The above-described series of processes carried out by the shot cut detection unit 13 constitutes another shot cut detecting method devised by the inventors. This method will be referred to as the color-of-interest difference shot cut detecting method in the ensuing description.

The overall color feature difference shot cut detecting method and the color-of-interest difference shot cut detecting method are independent of each other, so that one of the two methods may be used to detect shot cuts. Preferably, however, combining the overall color feature difference shot cut detecting method with the color-of-interest difference shot, cut detecting method permits more accurate detection of shot cuts.

Illustratively, FIG. 29 is a flowchart of detailed steps constituting a shot cut detecting process that combines the overall color feature difference shot cut detecting method with the color-of-interest difference shot cut detecting method. The steps indicate in detail what, takes place in step S3 of FIG. 2.

In step S21, the shot cut detection unit 13 determines the input frame as the frame of interest.

In step S22, the shot cut detection unit 13 computes the color difference feature quantity ΔH of the frame of interest using the expression (11) above and other expressions.

In step S23, the shot cut detection unit 13 checks to determine whether the color difference feature quantity ΔH is larger than the threshold value T1 (i.e., ΔH>T1).

If in step S23 the color difference feature quantity ΔH is found larger than the threshold value T1, then the shot cut detection unit 13 goes to step S24. In step S24, the shot cut detection unit 13 detects that the frame of interest is a shot cut. Step S24 is followed by step S30 that will be described later along with subsequent steps.

If the result of the check in step S23 is negative, i.e., if the color difference feature quantity ΔH is not found larger than the threshold value T1, then the shot cut detection unit 13 goes to step S25. In step S25, the shot cut detection unit 13 computes the color-of-interest ratio DCR of the frame of interest.

In step S26, the shot cut detection unit 13 checks to determine whether the color-of-interest ratio DCR is higher than 50 percent (i.e., DCR>50).

If the result of the check in step S26 is negative, i.e., if the color-of-interest ratio DCR is not found higher than 50 percent, then the shot cut detection unit 13 goes to step S27. In step S27, the shot cut detection unit 13 detects that the frame of interest is not a shot cut. Step S27 is followed by step S30 that will be described later along with subsequent steps.

If the result of the check in step S26 is affirmative, i.e., if the color-of-interest ratio OCR is found higher than 50 percent, then the shot cut detection unit 13 goes to step S28. In step S28, the shot cut detection unit 13 computes the color-of-interest difference feature quantity ΔDCR of the frame of interest using the expression (12) above and other expressions.

In step S29, the shot cut detection unit 13 checks to determine whether the color-of-interest difference feature quantity ΔDCR is larger than the threshold value T2 (i.e., ΔDCR>T2).

If the result of the check, in step S23 is affirmative, i.e., if the color-of-interest difference feature quantity ΔDCR is found larger than the threshold value T2, then the shot cut detection unit 13 goes to step S24 and detects that the frame of interest is a shot cut.

If the result of the check in step S29 is negative, i.e., if the color-of-interest difference feature quantity ΔDCR is not found larger than the threshold value T2, then the shot cut detection unit 13 goes to step S27 and detects that the frame of interest is not a shot cut.

Upon completion of step S24 or S27, i.e., after detecting whether the frame of interest is a shot cut, the shot cut detection unit 13 goes to step S30. In step S30, the snot cut detection unit 13 checks to determine whether the frame of interest is the last frame.

If in step S30 the frame of interest is not found to be the last frame, then the shot cut detection unit 13 returns to step S21 and repeats the subsequent steps.

The loop of steps S21 through. S30 above is repeated on each of the frames making up the moving image content.

Checks are thus made to determine whether each of the frames involved is a shot cut. When the check in step S30 reveals that the frame of interest is the last frame, the shot cut detecting process comes to an end. That is, step S3 in FIG. 2 is terminated and followed by the shot classifying process of step S4.

The foregoing detailed description in reference to FIGS. 23 and 29 was about how the shot cut detection unit 13 typically works as a component unit of the image processing apparatus in FIG. 1. When used as described, the shot cut detection unit 13 divides an entire image (i.e., frame) into a plurality of areas. Each of the divided areas is described using robust feature quantities of the horizontal movements of cameras and people. Shot cuts are then detected with high precision through the use of the color distribution features in each of the divided areas and of the area-specific feature of the color of interest. This makes it possible automatically to furnish meta information for use in analyzing sports-related and other images.

Described below in detail with reference to FIGS. 30 through 36 is the snot classification unit 14 as another component, of the image processing apparatus in FIG. 1.

As a result of the shot cut detecting process performed by the above-described shot cut detection unit 13, the moving image content, is divided into a plurality of shots. Each, of these multiple shots is classified by the shot classification unit 14 into at least one predate trained type called shot types, to be described later.

Where soccer match images are adopted as the moving image content as in the case of this embodiment, four predefined shot, types may be assumed: "Long," "Medium," "Close-up," and "Out" as shown in FIG. 30.

Figure 30:
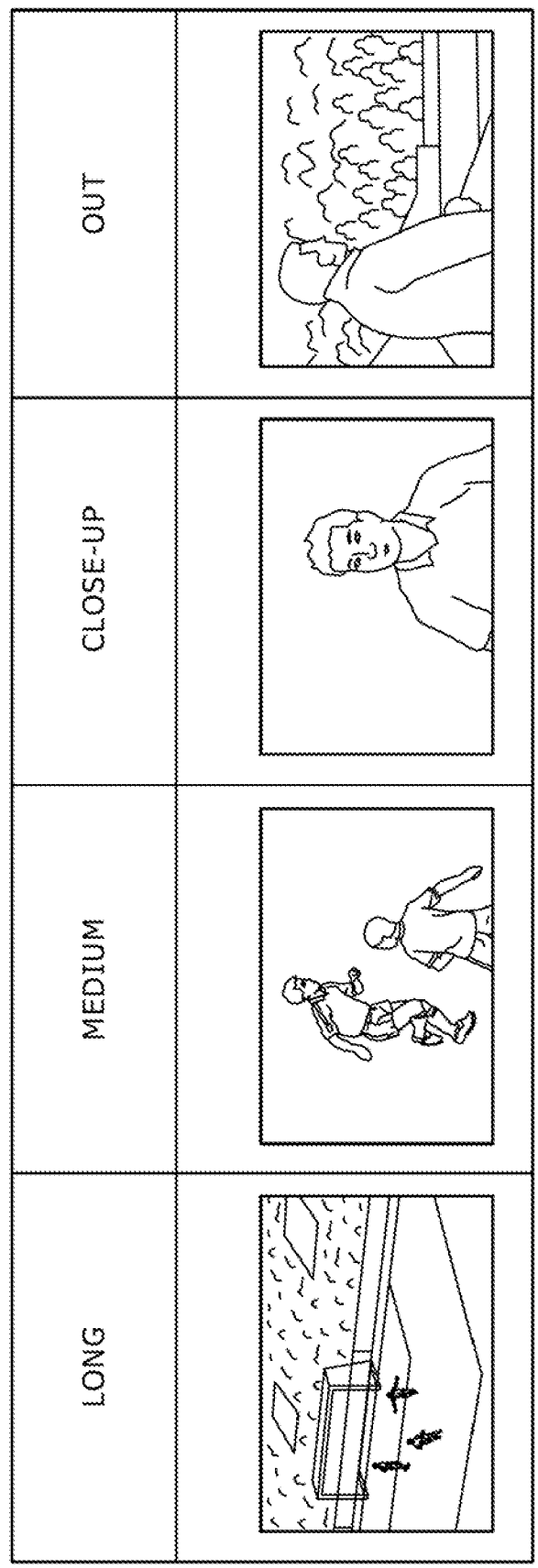
FIG. 30 is a schematic view explanatory of typical shot types classified by a shot classification unit in FIG. 1.

As can be seen from sample images in FIG. 30, the "Long" type is a shot that reveals an overall situation of the ongoing soccer match. This is the shot, of a sweeping view showing mainly the playfield area and players in perspective. The "Medium" type is a shot of a zoomed-in state with several players shown in the playfield area. The "Close-up" type is self-explanatory, a shot that closes in on one or two players in such a manner that their faces are distinguishable. The "Out" type is a shot that does not include the playfield area.

Figure 31:
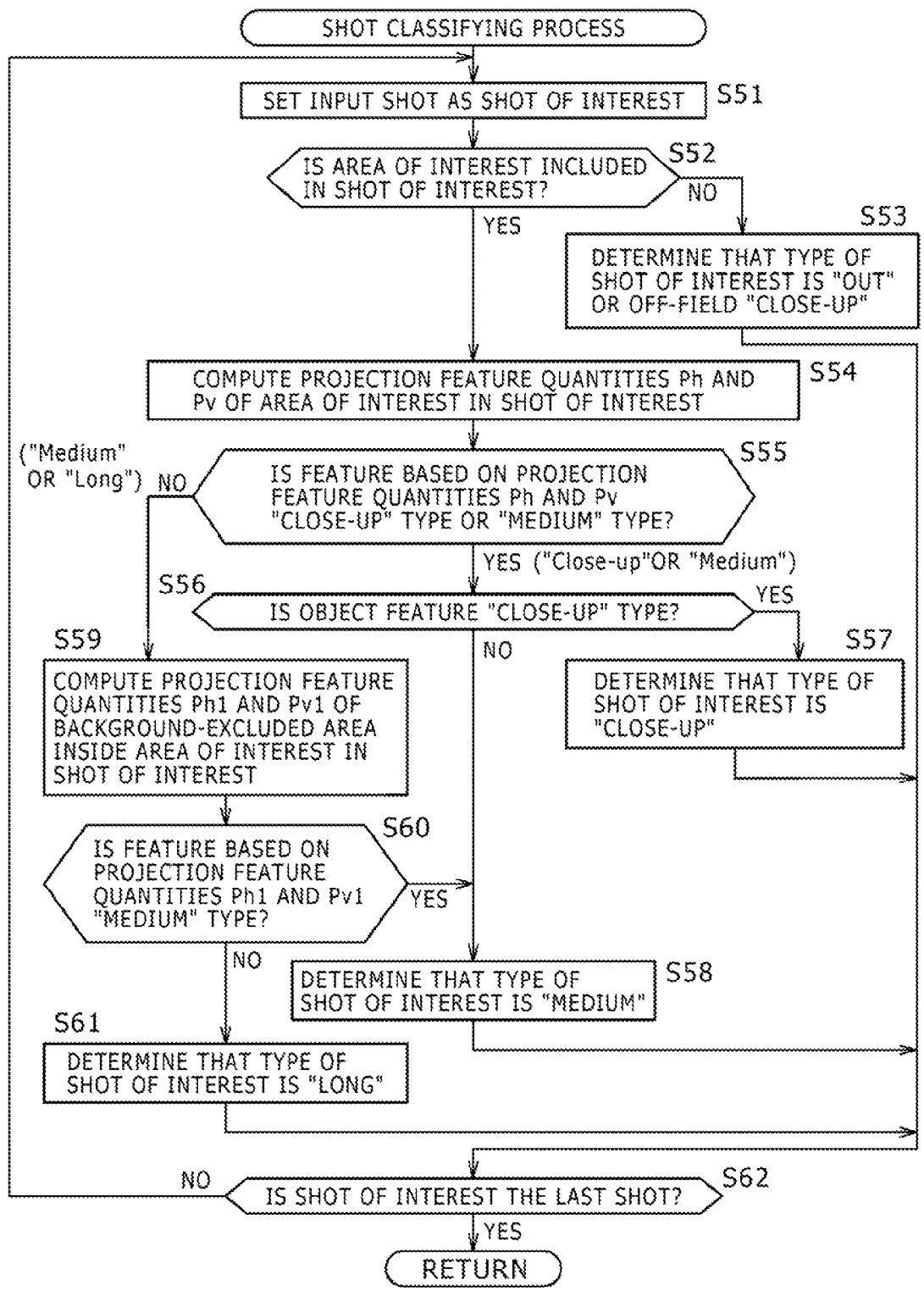
FIG. 31 is a flowchart of detailed steps constituting a shot classifying process in step S4 of FIG. 2, the process being performed where the shot types shown in FIG. 30 are adopted.

FIG. 31 is a flowchart of detailed steps constituting the shot classifying process in step S4 of FIG. 2, whereby shots are each classified into one of the four predefined shot types outlined above.

In step S51, the shot classification unit 14 sets the input shot as the shot of interest.

In step S52, the shot classification unit 14 checks to determine whether the area of interest is included in the shot of interest, i.e. whether the playfield area is included in the shot of interest in the case of this embodiment.

If in step S52 the area of interest is not found included in the shot of interest, then the shot classification unit 14 goes to step S53. In step S53, the shot classification unit 14 determines that the type of the shot of interest is "Out" or off-field "Close-up." Step S53 is followed by step S62 that will be described later along with subsequent steps.

The off-field "Close-up" type refers to a shot in which one or two players are focused so that their faces are distinguishable, with little of the playfield area detected. In that sense, the off-field "Close-up" type could be regarded as part of the "Out" type but these two are made distinct from each other because the faces distinguished in an off-field "Close-up" shot are usable in their own right.

If the result of the check in step S52 is affirmative, i.e., if the playfield area is found included in the shot of interest, then the shot classification unit 14 goes to step S54.

In step S54, the shot classification unit 14 computes projection feature quantities Ph and Pv of the area of interest in the shot of interest.

More specifically, the shot classification unit 14 computes the vertical projection feature quantities Ph(i) for each of H pixels in the vertical direction and the horizontal projection feature quantities Pv(j) for each of W pixels in the horizontal direction illustratively by use of the expression (2) given above.

In order to counter the effects of noise, the shot classification unit 14 performs resolution reduction on the vertical projection feature quantities Ph(i) for each of H pixels in the vertical direction to obtain the quantities for 10 pixels, and also carries cut resolution reduction on the horizontal projection feature quantities Pv(j) for each of W pixels in the horizontal direction to acquire the quantities of 30 pixels.

The resolution reduction above results in acquisition of the projection feature quantities Ph and Pv regarding the area of interest in the shot of interest, the quantities being indicative of the distribution of the vertical projection feature quantities Ph(i) for each of 10 pixels and the distribution of the horizontal projection feature quantities Pv(j) for each of 30 pixels.

An example of the vertical projection feature quantities Ph is given by a graph 111-B of FIG. 17 showing how individual vertical projection feature quantities Pb(i) are typically distributed. In other words, the vertical projection feature quantities Ph are defined as a projected distribution, on one vertical line, of the pixels (except those of the object) having the color feature of the playfield from among the pixels making up the playfield area.

An example of the horizontal projection feature quantities Pv is given by a graph 111-V of FIG. 17 showing how individual horizontal projection feature quantities Pv(j) are typically distributed. In other words, the horizontal projection feature quantities Pv are defined as a projected distribution, on one horizontal line, of the pixels (except those of the object) having the color feature of the playfield from among the pixels making up the playfield area.

In step S55, the shot classification unit 14 checks to determine whether the feature based on the projection feature quantities Ph and Pv regarding the area, of interest in the shot of interest is the "Close-up" or "Medium" type.

The feature based on the projection feature quantities Ph and Pv regarding the areas of interest in the shot of interest is not limited to anything specific as long as it serves to make the shot type classifiable. In this case, the features shown in the able of FIG. 32 are assumed to be usable.

The feature representative of the "Close-up" or "Medium" type means that the shot of interest is such as to be classifiable into the "Close-up" or "Medium" type. The same basically applies to the other types to be described later.

Figure 32:
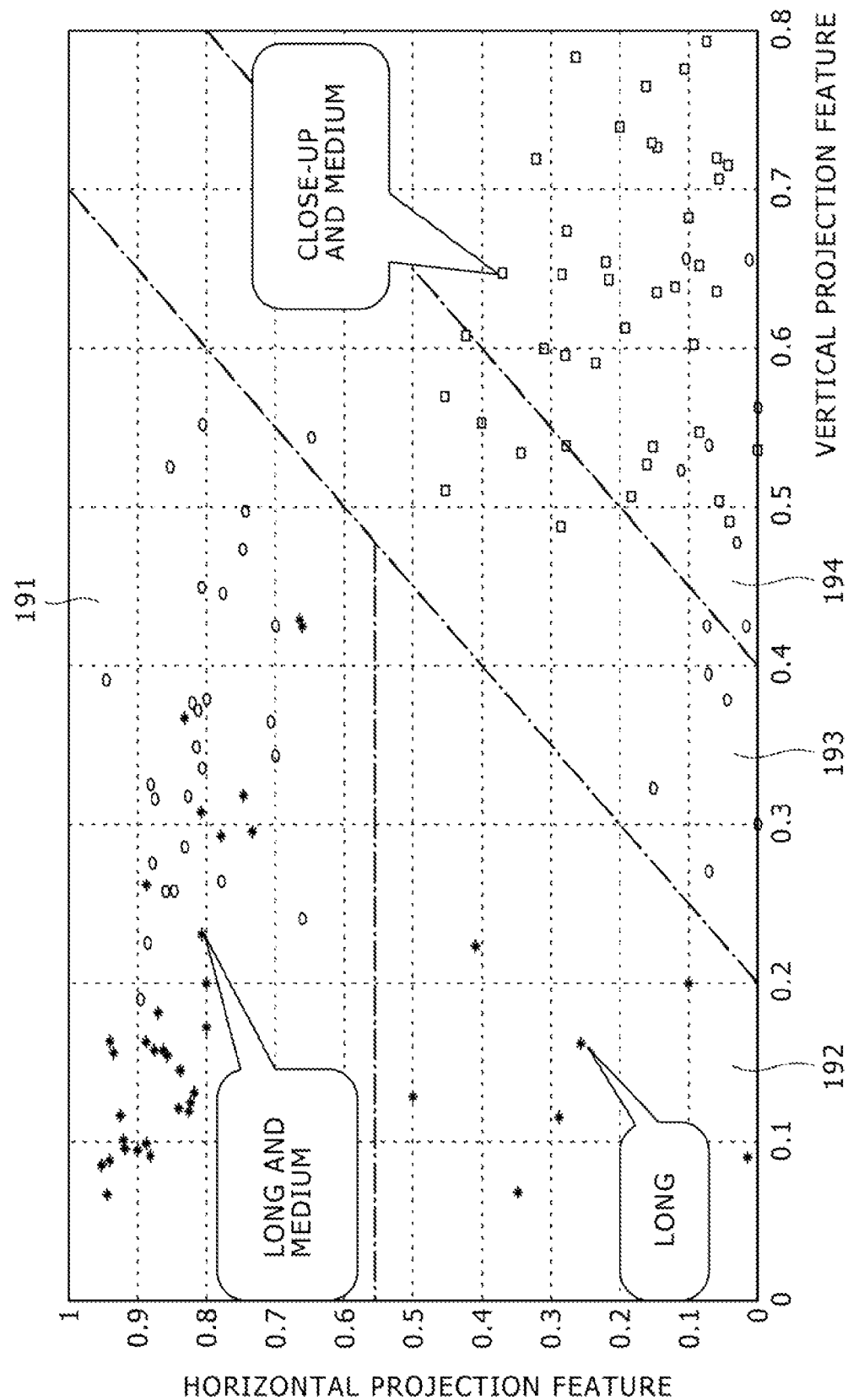
FIG. 32 is a graphic representation explanatory of typical information for use in the shot classifying process of FIG. 31.

FIG. 32 is a graphic representation showing typical relations between the projection feature quantities Ph and Pv of the area of interest in shots on the one hand, and possible shot types on the other hand.

The vertical projection feature along the horizontal axis in FIG. 32 represents the differences between maximum and minimum values of the horizontal projection feature quantities Pv(j) for each of 30 pixels, the quantities resulting from the same process as that in step S54 performed on a given shot. That is, the vertical projection feature corresponds to the differences between maximum and minimum values of the distributed horizontal projection feature quantities Pv.

The horizontal projection feature along the vertical axis in FIG. 32 represents the differences between maximum and minimum values of the vertical projection feat/tire quantities Ph(i) for each of 10 pixels, the quantities resulting from the same process as that in step S54 performed on a given shot. That is, the vertical projection feature corresponds to the differences between maximum and minimum values of the distributed vertical projection feature quantities Ph.

In FIG. 32, the points indicated by asterisks (*) are given by plotting the results of the same process as that, of step S54 above performed on each of the shots already known as "Long-" shots. The points represented by small hollow circles are given by plotting the results of the same process as that of step S54 above carried out on each of the shots already known as "Medium" shots. The points denoted by small hollow rectangles are given by plotting the results of the same process as that of step S54 above executed on each of the shots already known as "Close-up" shots.

Plotting the results of the same process as that of step S54 above in the table of FIG. 32 means plotting the projection feature quantities Pv and Ph derived from the same process as that of step S54. More specifically, each of the points involved is plotted using the differences between distributed maximum and minimum values indicated, by the horizontal, projection, feature quantities Pv along the horizontal axis and the differences between distributed maximum and minimum values represented by the vertical projection feature quantities Ph along the vertical axis in the table of FIG. 32.

As a result of the plotting of such multiple shots whose types are known, an area 191 in the table of FIG. 32 is seen containing the points indicative of "Long" or "Medium" shots. In other words, with the results of the process in step S54 above plotted in the table of FIG. 32, if a given point being plotted is found included in the area 191, the corresponding shot of interest may be regarded as classifiable into the "Long" or "Medium" type.

Plotting the result of the process in step S54 above means plotting the projection feature quantities Pv and Ph derived from step S54. More specifically, the points involved are plotted using the differences between distributed maximum and minimum values indicated by the horizontal projection feature quantities Pv along the horizontal axis and the differences between distributed maximum and minimum values represented by the vertical projection feature quantifies Ph along the vertical axis in the table of FIG. 32.

In like manner, as a result of the plotting of multiple shots whose types are known, an area 192 in the table of FIG. 32 is seen containing the points representative of "Long" shots. In other words, with the results of the process in step S54 above plotted in the table of FIG. 32, if a given point being plotted is found included in the area 192, the corresponding shot of interest may be regarded as classifiable into the "Long" type.

As a result of the plotting of multiple shots whose types are known, an area 193 in the table of FIG. 32 is seen containing the points representative of "Long," "Medium" and "Close-up" shots. In other words, with the results of the process in step S54 above plotted in the table of FIG. 32, if a given point being plotted is found included in the area 193, the corresponding shot of interest is difficult to classify. That means the area 193 is a so-called gray zone.

As a result of the plotting of multiple shots whose types are known, an area 194 in the table of FIG. 32 is seen containing the points representative of "Close-up" or "Medium" shots. In other words, with the results of the process in step S54 above plotted in the table of FIG. 32, if a given point being plotted is found included in the area 194, the corresponding shot of interest may be regarded as classifiable into the "Close-up" or "Medium" type.

The area 193 was described as the gray zone in which it is difficult to classify the shot of interest into any of the "Long," "Medium" or "Close-up" type. In practice, however, the shot of interest is rarely, if ever, classified into the "Long" type. Actually the area 193 is close to the area 194 in nature. For the purpose of simplifying shot type classification, with the results of the process in step S54 above plotted in the table of FIG. 32, if a given point being plotted is found included in the area 193 or 194, the corresponding shot of interest is thus classified into the "Close-up" or "Medium" type in the case of this embodiment.

That is, with the results of the process in step S54 above plotted in the table of FIG. 32, if the plotted point is found included in the area 193 or 194, then the result of the check in step S55 is affirmative. That means the type of the shot of interest is "Close-up" or "Medium," representative of the feature based on the projection feature quantities Ph and Pv of the area of interest in the shot of interest. The shot classification unit 14 then goes to step S56.

In step S56, the shot classification unit 14 checks to determine whether the object feature is the "Close-up" type.

If the object feature is found to be the "Close-up" type, the shot classification unit 14 goes to step S57, In step S57, the shot classification unit 14 determines that the type of the shot of interest is "Close-up." Step S57 is followed by step S62 that will be described later along with subsequent steps.

If in step S56 the object feature is not found to be the "Close-up" type, i.e., if the object feature turns out to be the "Medium" type, then the shot classification unit 14 goes to step S58. In step S58, the shot classification unit 14 determines that the type of the shot of interest is "Medium." Step S58 is followed by step S62 that will be described later along with subsequent steps.

If the result of the check in step S55 is affirmative, that means the shot of interest is classifiable into the "Close-tip" or "Medium" type. In this case, the shot of interest is classified as a "Close-up" or "Medium" shot based on the object feature extracted by the above-described object feature extraction unit 12 shown in FIG. 1.

In the case above, there are many types of object features that may be extracted by the object feature extraction unit 12. Any of these feature types may be used singly or in combination.

Figure 33:
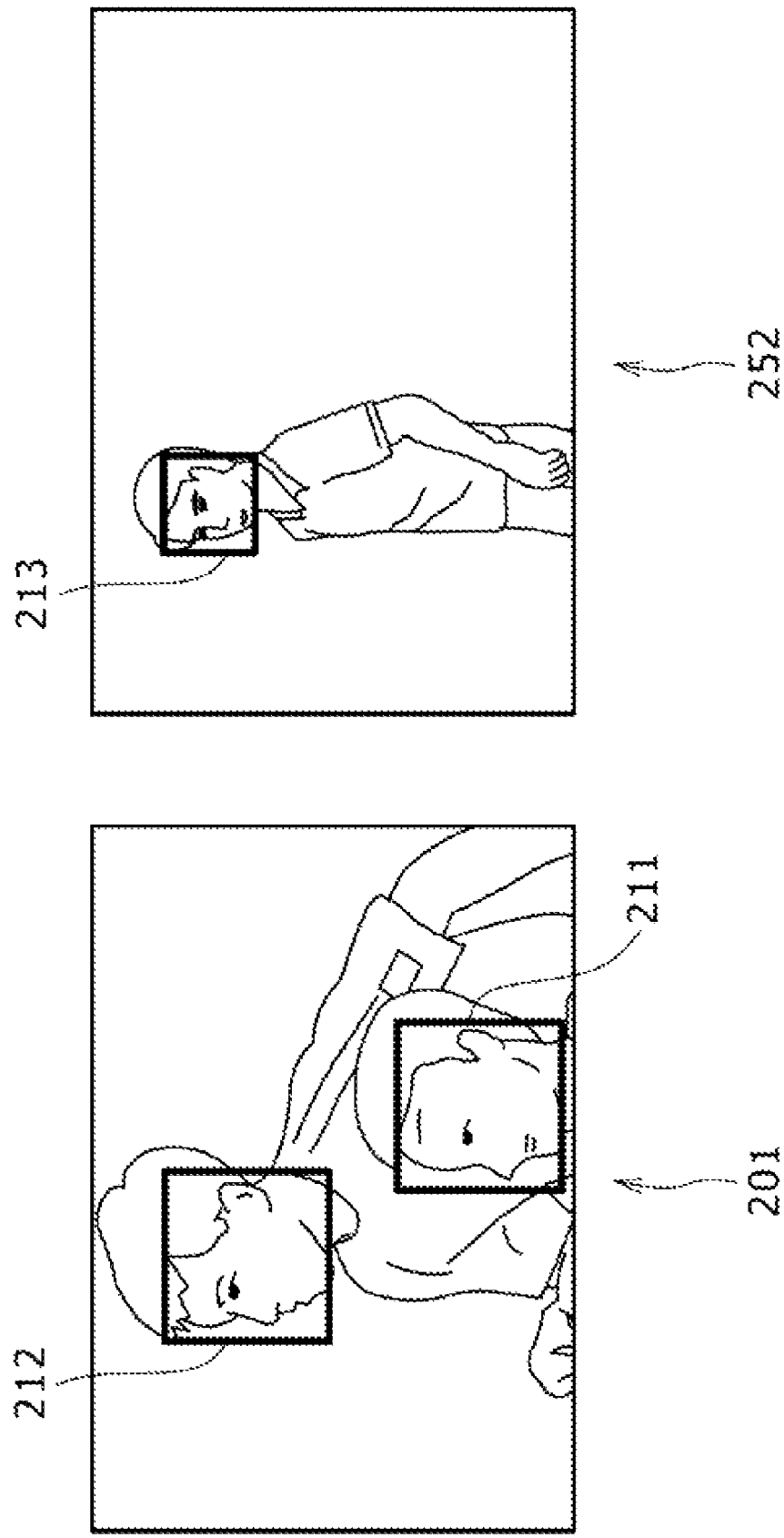
FIG. 33 is a schematic view explanatory of another typical information for use in the shot classifying process of FIG. 31.
Figure 34:
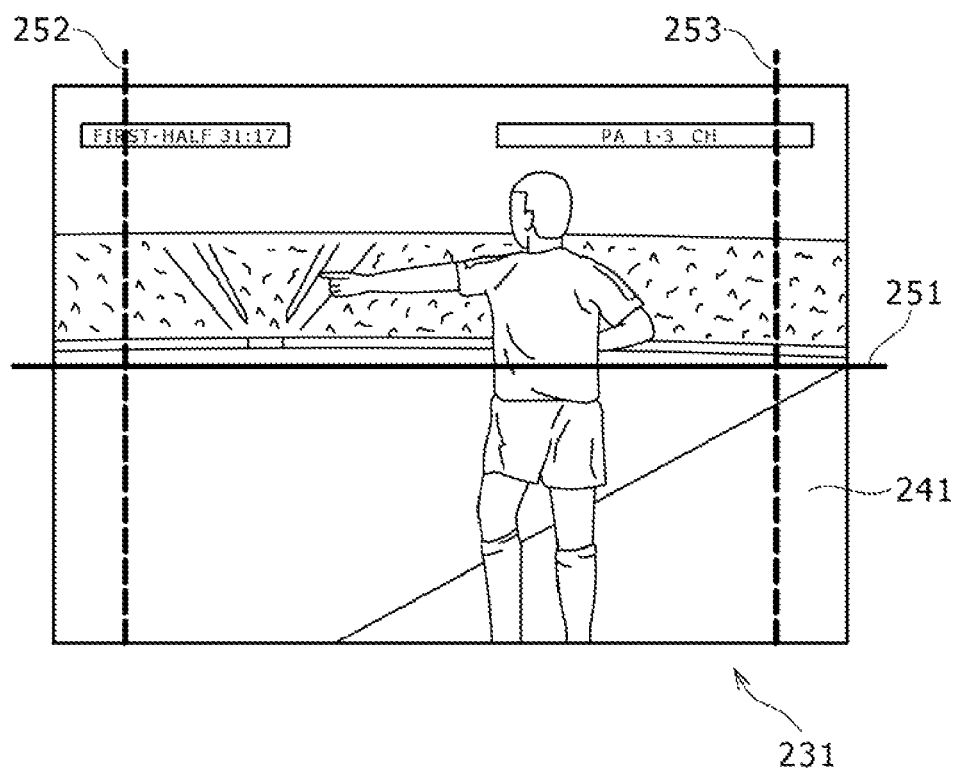
FIG. 34 is a schematic, view explanatory of another typical information for use in the shot classifying process of FIG. 31.
Figure 35:
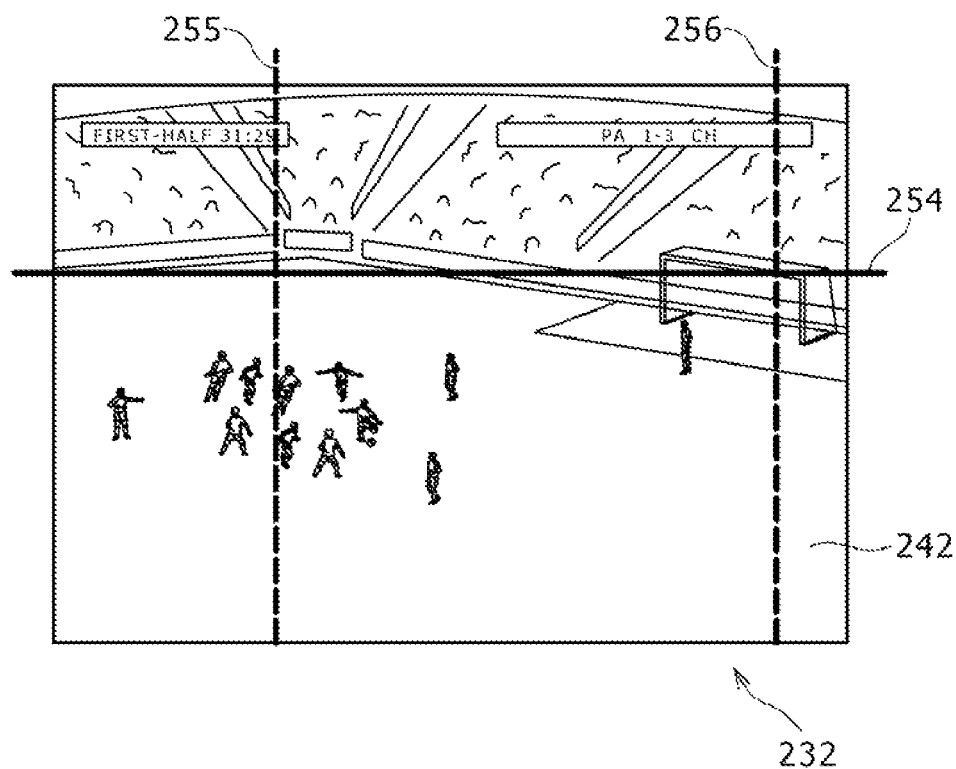
FIG. 35 is a schematic view explanatory of another typical information for use in the shot classifying process of FIG. 31.

In the example of FIG. 33, face areas 211 and 212 are detected in an image 202 while a face area 213 is detected in an image 202. A comparison of the face areas 211 and 212 with the face area 213 reveals a difference in size. Then with the face area size regarded as the feature quantity, face areas exceeding a predetermined threshold size may be defined as the "Close-up" type while face areas smaller than the threshold value may be defined as the "Medium" type. In other words, the snot classification unit 14 may determine that the shot of interest including a face area exceeding the threshold size is a "Close-up" shot and that the shot of interest including a face area smaller than the threshold size is a "Medium" shot.

Even if no face area has been extracted by the object feature extraction unit 12, the shot classification unit 14 may illustratively resort to the colors of the players' uniform. That is, if the player area is extracted by use of the uniform colors, the shot classification unit 14 may classify the shot of interest as a "Medium" or "Close-up" shot using the width of the extracted area as the feature quantities.

Thus with the results of the process in step S54 above plotted in the table of FIG. 32, if a given point being plotted is found included in the area 193 or 194, then the result of the check in step S55 on that point is affirmative. In this case, the shot of interest is found to be the "Close-up" or "Medium" type in steps S56 through 358.

By contrast, with the results of the process in step S54 above plotted in the table of FIG. 32, if a given point being plotted is found included in the area 191 or 192, then the result of the check in step S55 on that point is negative. In this case, the shot of interest is found to be the "Medium" or "Long" type in step S59 and subsequent steps, to be described below.

In step S59, the shot classification unit 14 computes the projection feature quantities Ph1 and Pv1 of a background-excluded area in the shot of interest.

The background-excluded area, in soccer match images, refers to an area from which the background such as the stands is excluded. In a soccer match image 231 of FIG. 34, the regions except for a playfield area 241 constitute the background area. Thus in the soccer match image 231, the area under a solid line 251 and flanked by broken lines 252 and 253 is adopted as the background-excluded area. Likewise in a soccer match image 232 of FIG. 35, the regions excluding a playfield area 242 make up the background area. Thus in the soccer match image 232, the area under a solid line 254 and flanked by broken lines 255 and 256 is adopted as the background-excluded area.

Given the background-excluded area explained above, the snot classification unit 14 computes the vertical projection feature quantities Ph(i) for each of H pixels in the vertical direction and the horizontal projection feature quantities Pv(j) for each of W pixels in the horizontal direction by use of the expression (2) discussed earlier.

In order to reduce the effects of noise, the shot-classification unit 14 performs resolution reduction on the vertical projection feature quantities Ph(i) for each of ii pixels in the vertical direction to obtain the quantities Phi(i) for 10 pixels, and also executes resolution reduction on the horizontal projection feature quantities Pv(j) for each of W pixels in the horizontal direction to acquire the quantities Pv1(j) for 30 pixels.

The resolution reduction above results in acquisition of the projection feature quantities Ph1 and Pv1 regarding the background-excluded area, the quantities being indicative of the distribution of the vertical projection feature quantities Ph1(i) for each of 10 pixels and the distribution of the horizontal projection feature quantities Pv1(j) for each of 30 pixels.

In step S60, the shot classification unit 14 checks to determine whether the feature based on the projection feature quantities Ph1 and Pv1 regarding the background-excluded area is the "Medium" type.

When the multiple shots plotted in the area 191 of FIG. 32 are again plotted using the background-excluded area for each shot, the "Long" and the "Medium" shots in the background-excluded area are found included in areas 271 and 272, respectively, of the area 191 as shown in FIG. 36.

Thus with the results of step S59 plotted in the tables of FIGS. 32 and 36, if a given point being plotted is found included in the area 272, then the result of the check in step S60 on that point is affirmative. That is, the feature based on the projection feature quantities Ph1 and Pv1 regarding the background-excluded area is found to be the "Medium" type. In this case, step S60 is followed by step S58 in which the shot classification unit 14 determines that the type of the shot of interest is "Medium."

On the other hand, with the results of step S58 plotted in the tables of FIGS. 32 and 36, if a given point being plotted is found included in the area 192 (FIG. 32) or in the area 271 (FIG. 36), then the result of the check in step S60 on that point is negative. That is, the feature based on the projection feature quantities Ph1 and Pv1 regarding the background-excluded area is found to be the "Long" type. In this case, step S60 is followed by step S61 in which the shot classification unit 14 determines that the type of the shot of interest is "Long."

After step S53, S57, S58, or S61 is completed, i.e., after the type of the shot of interest is found to be the "Out" type, off-field "Close-up" type, "Close-up" type, "Medium" type, or "Long" type, the shot classification unit 14 goes to step S62.

In step S62, the shot classification unit 14 checks to determine whether the shot of interest is the last shot.

If in step S62 the shot of interest is not found to be the last shot, then step S51 is reached again and the subsequent steps are repeated.

The loop of steps S51 through S62 above is thus executed repeatedly on each of the shots making up the moving image content so that the type of each shot, is determined successively. When the type of the last shot is determined, the result of the check in step S62 becomes affirmative, and the shot classifying process is terminated. That means the process of step S4 in FIG. 2 comes to an end, followed by the highlight detecting process of step S5.

The foregoing description in reference to FIGS. 30 through 36 was about how the shot classification unit 14 typically works as another component unit of the image processing apparatus in FIG. 1. When used as described, the shot classification unit 14 can classify diverse shots into suitable types by taking advantage of the projection features in the area of interest (e.g., above-described projection feature quantities Ph and Pv) or the object features in the area of interest or in adjacent areas. As a result, shot classification is accomplished with high accuracy.

Described below in detail with reference to FIGS. 37 through 44 is the highlight detection unit 15 as another component of the image processing apparatus in FIG. 1. FIG. 37 shows a framework in which the highlight detectors unit 15 extracts highlights. As indicated in FIG. 37, the process of highlight detection is performed basically on three layers, 1 through 3.

Layer 1 is a layer that represents the rules of temporal relevance of shot types between shots, or a statistical model of such rules of relevance. The shot types are those classified by the shot classification unit 14. Illustratively, this embodiment aimed at dealing with soccer match images has four shot types, "Long," "Medium," "Close-up" and "Out," as shown in FIG. 30 explained above.

It may be assumed here that a plurality of shot groups were prepared as learning-use images known to constitute a corner kick scene to be extracted as a highlight of a soccer match, that the rules of temporal relevance of shot types were learned from these learning-use images, and that the resulting rules were arranged into a statistical model. On that assumption, when a moving image content is input anew, the highlight detection unit 14 recognizes temporal transition of the shot types of the new content, such as the shot types shown in FIG. 11. If the highlight detection unit 14 detects a shot, group that matches or is similar to the statistical model, that shot group is extracted as a highlight.

Layer 2 is a layer that represents the rules of temporal relevance between significant frames among those constituting a given shot, or a statistical model of such rules of relevance.

It may also foe assumed, that a plurality of shot groups were prepared as learning-use images known to constitute a corner kick scene to be extracted as a highlight of a soccer match, that the rules of temporal relevance between the types of the frames constituting a given shot were learned from these learning-use images, and that the resulting rules were arranged into a statistical model. On that assumption, the highlight detection unit 14 recognizes the temporal transition of the frame types in each of the shots making up a given moving image content, such as the temporal transition of the frame types shown in FIG. 10. If the highlight detection unit 14 detects a shot that matches or is similar to the statistical model, that shot is extracted at least, as part of a highlight. The frame types such as "Upper Corner" shown in FIG. 10 will be discussed later in reference to FIG. 42.

Layer 3 is a layer that gives relevance to frames based on their feature quantities. The frames thus made relevant on layer 3 are used to obtain rules of temporal relevance between frames. The obtained rules constitute layer 2. For use as the feature quantities within frames, this embodiment may adopt the feature quantities of soccer match images, such as the object features described above in reference to FIGS. 17 through 27, i.e., various object features extracted by the object feature extraction unit 12 in FIG. 1. Alternatively, where the transition of frame types is used as described above in connection with layer 2, the frame types may be utilized as the feature quantities within frames. The frame types are determined on the basis of the object features extracted by the object feature extraction unit 12 in FIG. 1, to be discussed latter with reference to FIG. 42.

Figure 38:
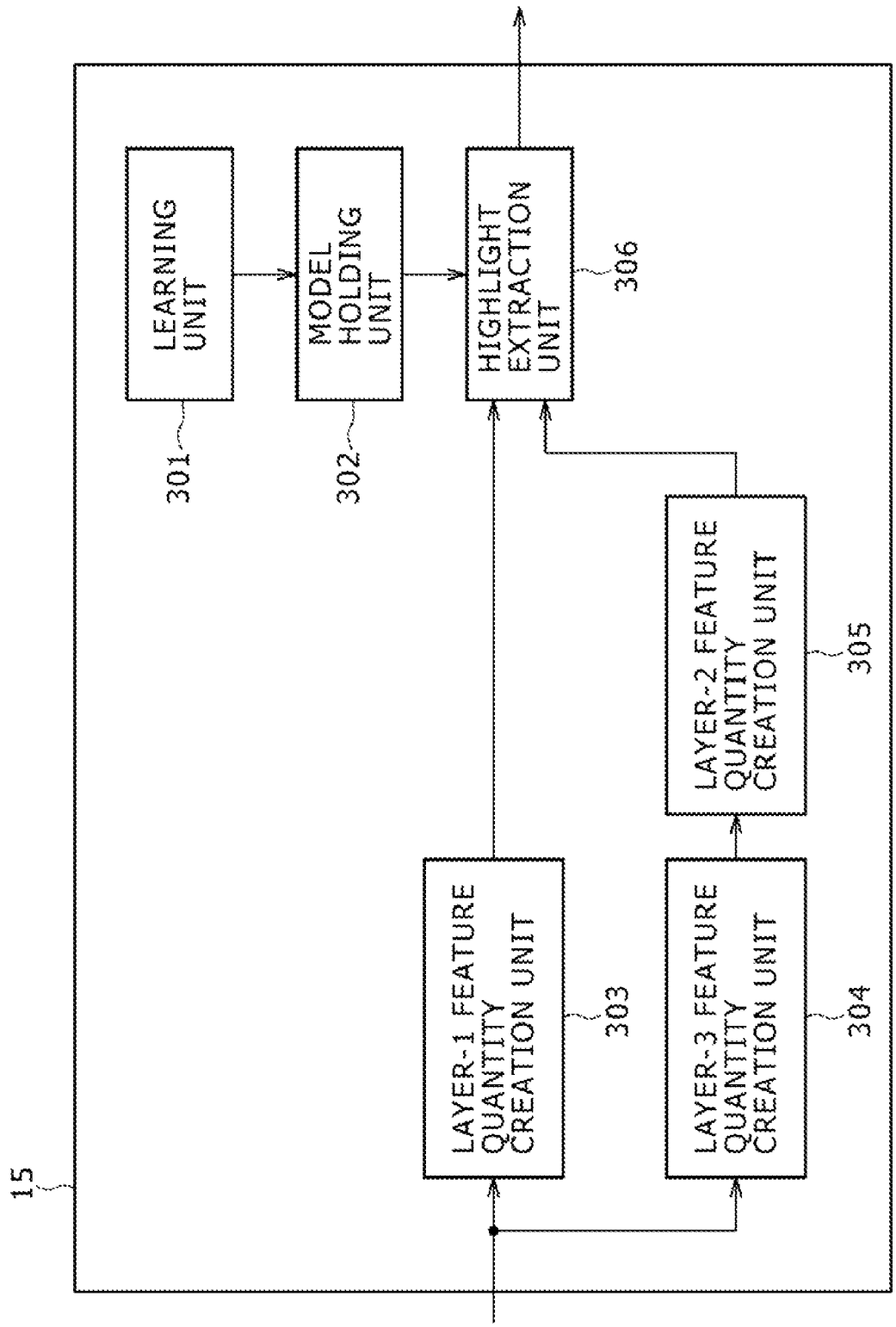
FIG. 38 is a functional block diagram showing a detailed functional structure of the highlight detection unit in FIG. 1.

FIG. 38 is a functional block diagram showing a detailed functional structure of the highlight detection unit 15.

This highlight detection unit 15 is structured to include component units ranging from a learning unit 301 to a highlight extraction unit 306.

The learning unit 301 learns the rules of layers 1 and 2 mentioned above and causes a model holding unit 302 to hold a statistical model acquired as a result of the learning. The learning unit 301 will be discussed later in more detail with reference to FIGS. 40 through 44.

The shot classification unit 14 inputs a moving image content to a layer-1 feature quantity creation unit 303 and a layer-3 feature quantity creation unit 304. As shown in FIG. 1, the moving image content input by the shot classification unit 14 is a content that has undergone the processes in which object features were extracted from each frame by the area-of-interest extraction unit 11 and object feature extraction unit 12; a plurality of shots were classified by the shot cut detection unit 13; and each of the multiple shuts was classified into a suitable shot type by the shot classification unit 14.

The layer-1 feature quantity creation unit 303 creates feature quantities for highlight extraction on layer 1 (called the layer-1 feature quantities hereunder). The feature quantities thus created are supplied to the highlight extraction unit 306.

The layer-1 feature quantities may vary depending on the layer-1 statistical model held by the model holding unit 302.

Illustratively, if the layer-1 statistical model is given as a state transition diagram of which the states are represented by the sequence of temporal transition from one shot type to another as well as by specific shot types, then the temporal transition of shot types such as those shown in FIG. 11 may be adopted as layer-1 feature quantities.

It may be assumed that the layer-1 statistical model points to a corner kick scene of a soccer match if the following two conditions are met: (1) there exist at the most a predetermined number of non-"Long" shots coming before a "Long" shot; and (2) there is at the most a predetermined total period (length) of non-"Long" shots. In that case, information representative of whether the two conditions are met may be adopted as the layer-1 feature quantities, the information being illustratively the number of non-"Long" shots prior to the "Long" shot to be processed (called the "Long" shot of interest hereunder) and the total period (length) of the non-"Long" shots.

The layer-3 feature quantity creation unit 304 creates the object features within frames and frame types as the layer-3 feature quantities as described above. The layer-3 feature quantities thus created are supplied to a layer-2 feature quantity creation unit 305.

The layer-2 feature quantity creation unit 305 creates feature quantities for highlight extraction on layer 2 (called the layer-2 feature quantities hereunder). The feature quantities thus created are supplied to the highlight extraction unit 306.

The layer-2 feature quantities may vary depending on a layer-2 statistical model held by the model holding unit 302.

Illustratively, if the layer-2 statistical model is given as the sequence of temporal transition from one frame type to another or as a state transition diagram such as one in FIG. 44, to be discussed later, then the temporal transition of frame types such as those shown in FIG. 10 may be adopted as layer-2 feature quantities.

It may be assumed that the layer-2 statistical model points to one of the shots making up a corner kick scene of a soccer match if the following four conditions are met: (1) the goal box is observed across several frames; (2) the center line is not observed in front of the goal box; (3) transition of the frames is such that the goal box moves from both sides of the screen toward the center; and (4) the corner is not observed at the beginning of the shot. In such a case, information representative of whether the four conditions are met may be adopted as the layer-2 feature quantities.

The highlight extraction unit 306 compares the layer-1 statistical model held by the model holding unit 302 with the layer-1 feature quantities coming from the layer-1 feature quantity creation unit 303. The highlight extraction unit 306 further compares the layer-2 statistical model held by the model holding unit 302 with the layer-2 feature quantities supplied from the layer-2 feature quantity creation unit 305. The results of the comparisons are integrally evaluated by the highlight extraction unit 306 before extracting a highlight.

FIG. 39 is a flowchart of detailed steps constituting the highlight detecting process in step S5 of FIG. 2. This process is performed by the highlight detection unit 15 of which the typical functional structure is illustrated in FIG. 38.

For the example of FIG. 39, it is assumed that the layer-1 and the layer-2 statistical models held by the model holding unit 302 are such as to point to a highlight when a first and a second condition are satisfied.

More specifically, where a corner kick of a soccer match is to be extracted as a highlight, the first condition may be formed by requirements such as the two conditions mentioned above: (1) there exist, at the most a predetermined number of non-"Long" shots coming before a "Long" shot; and (2) there is at the most a predetermined total period (length) of non-"Long" shots.

Likewise, the second condition above may be constituted by requirements such as the four conditions described above: (1) the goal box is observed across several frames; (2) the center line is not observed in front of the goal box; (3) transition of the frames is such that the goal box moves from both sides of the screen toward the center; and (4) the corner is not observed at the beginning of the shot.

When the highlight detecting process is started with the above conditions set to be met, step S71 is first reached and the layer-1 feature quantity creation unit 303 creates layer-1 feature quantities of a moving image content.

In step S72, the layer-3 feature quantity creation unit 304 creates layer-3 feature quantities of each of the frames in each of the shots making up the moving image content.

In step S73, the layer-2 feature quantity creation unit 305 creates layer-2 feature quantities of each of the shots constituting the moving image content.

Although steps S72 and S73 above were described as getting executed after step S71 in the example of FIG. 39, this is only an example and their sequence is not fixed. As evident from FIG. 38, step S71 undertaken by the layer-1 feature quantity creation unit 303, step S72 by the layer-3 feature quantity creation unit 304, and step S73 by the layer-2 feature quantity creation unit 305 are carried out independently of one another in parallel fashion.

In step S74, the highlight extraction unit 306 takes up a given shot in the moving image content as the shot of interest.

In step S75, the highlight extraction unit 306 checks to determine whether the layer-1 feature quantities of the shot of interest meet the first condition.

If in step S75 the first condition is found to be met by the layer-1 feature quantities of the shot of interest, then the highlight extraction unit 306 goes to step S78. In step S78, the highlight detection unit 306 determines that, the shot of interest is at least a part, of a highlight. Step S78 is followed by step S79 that will be described later along with subsequent steps.

If in step S75 the first condition is not found to foe met by the layer-1 feature quantities of the shot of interest, then the highlight extraction unit 306 goes to step S76. In step S76, the highlight detection unit 306 checks to determine whether the layer-2 feature quantities of the shot of interest meet the second condition.

If in step S76 the second condition is found to be met by the layer-2 feature quantities of the shot of interest, then the highlight extraction unit 306 goes to step S78. In step S78, the highlight detection unit 306 determines that the shot of interest is at least a part of a highlight. Step S78 is followed by step S79 that will be described later along with subsequent steps.

If in step S76 the second condition is not found to be met by the layer-2 feature quantities of the shot of interest, then the highlight extraction unit 306 goes to step S77. In step S77, the highlight extraction unit 306 determines that the shot of interest is not a highlight. Step S77 is followed by step S79.

That is, whether or not the shot of interest is a highlight is determined either in step S77 or in S78. Thereafter, control is passed on to step S79.

In step S79, the highlight extraction unit 306 checks to determine whether the shot of interest is the last shot.

If in step S79 the shot of interest is not found to be the last shot, then control is returned to step S74 and the subsequent steps are repeated.

The loop of steps S74 through S79 above is thus executed repeatedly on a suitable number of the shots making up the moving image content so as to see whether each shot examined is at least part of a highlight. When the last shot is reached, the result of the check in step S79 is affirmative. Step S79 is followed by step S80.

In step S80, the highlight extraction unit 306 extracts the highlight based on the results of the checks that, have been performed.

In the example of FIG. 39, as described above, a highlight is detected if the first condition is met by the layer-1 feature quantities or if the second condition is met by the layer-2 feature quantities. In other words, highlight detection is executed on the OR condition in the process of FIG. 39. However, the process is only an example and may be carried out alternatively on the AND condition. That, is, a highlight may be detected both if the first condition is met by the layer-1 feature quantities and if the second condition is met by the layer-2 feature quantities.

The foregoing description in reference to FIGS. 38 and 39 was mainly about how the highlight detecting process is carried out in order to detect a highlight from a newly input moving image content on the assumption that suitable statistical models are held by the model holding unit 302.

Described below with reference to FIGS. 40 through 44 is how such statistical models are typically created and updated.

Figure 40:
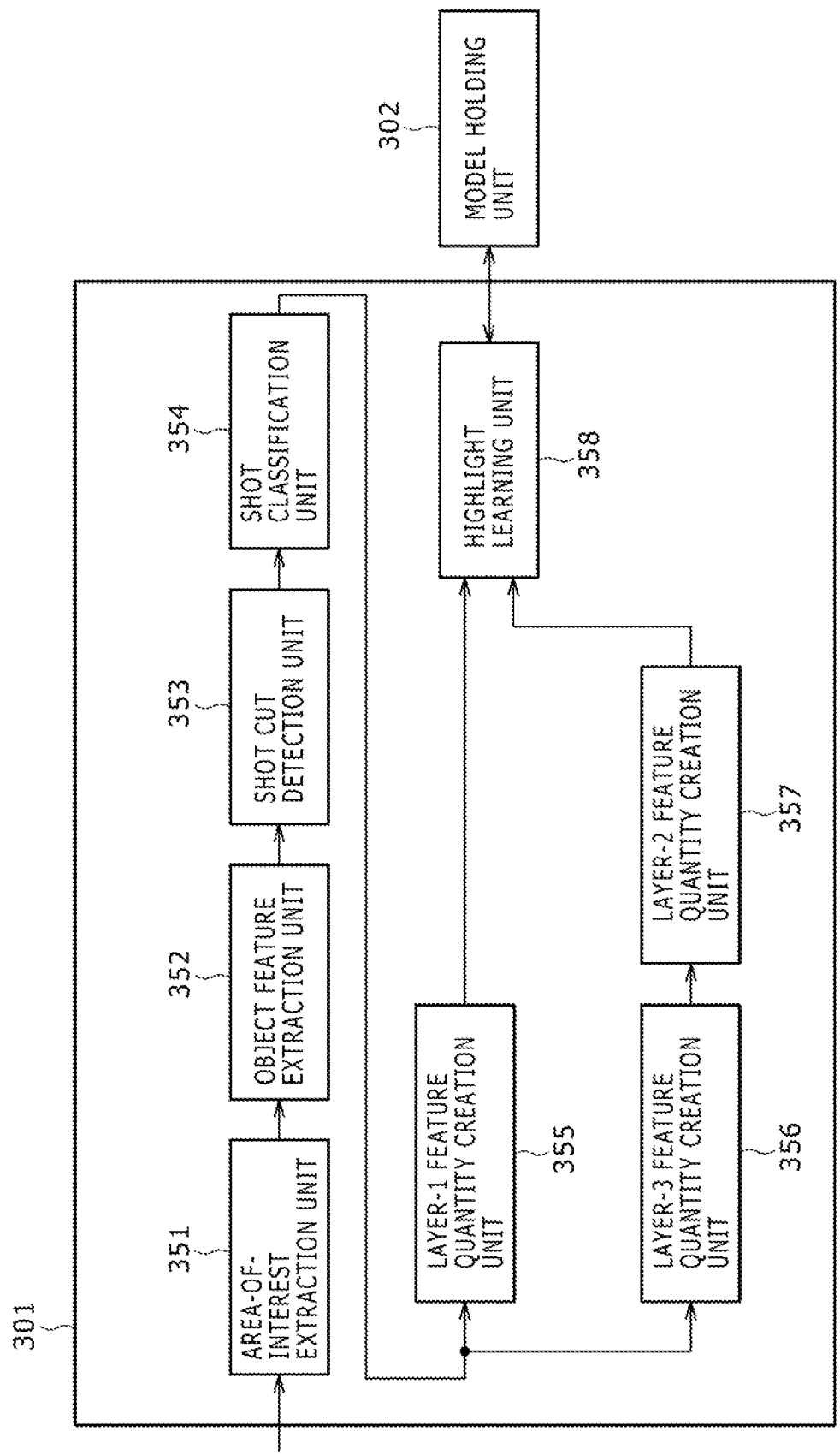
FIG. 40 is a functional block diagram showing a detailed functional structure of a learning unit in FIG. 38.

The process of creating and updating statistical models is carried out by the learning unit 301 as part of the highlight detection unit 15 in FIG. 38. FIG. 40 is a functional block diagram showing a detailed functional structure of the learning unit 301.

In the example of FIG. 40, the learning unit 301 is structured to include component units ranging from an area-of-interest extraction unit 351 to a highlight learning unit 358.

Of these component units, the area-of-interest extraction unit 351 through the shot classification unit 354 have basically the same structures and capabilities as the area-of-interest extraction unit 11 through the shot classification unit 14, respectively, in FIG. 1. Likewise the layer-1 feature quantity creation unit 355 through the layer-2 feature quantity creation unit 357 have basically the same structures and capabilities as the layer-1 feature quantity creation unit 303 through the layer-2 feature quantity creation unit 305 respectively in FIG. 38, the latter units constituting parts of the highlight detection unit 15 in FIG. 1.

Illustratively, various images of a corner kick scene, to be extracted as a highlight, of a soccer match, are input as learning-use images to the area-of-interest extraction unit 351 in the learning unit 301. In turn, the area-of-interest extraction unit 351 through the layer-2 feature quantity creation unit 357 carry out their respective processes discussed above. The resulting layer-1 and layer-2 feature quantities of the learning-use images are input to the highlight learning unit 358.

The highlight learning unit 358 then learns the layer-1 feature quantities of diverse learning-use images so as to create or update the layer-1 statistical model accordingly. The layer-1 statistical model thus created or updated is sent to and held by the model holding unit 302.

Figure 41:
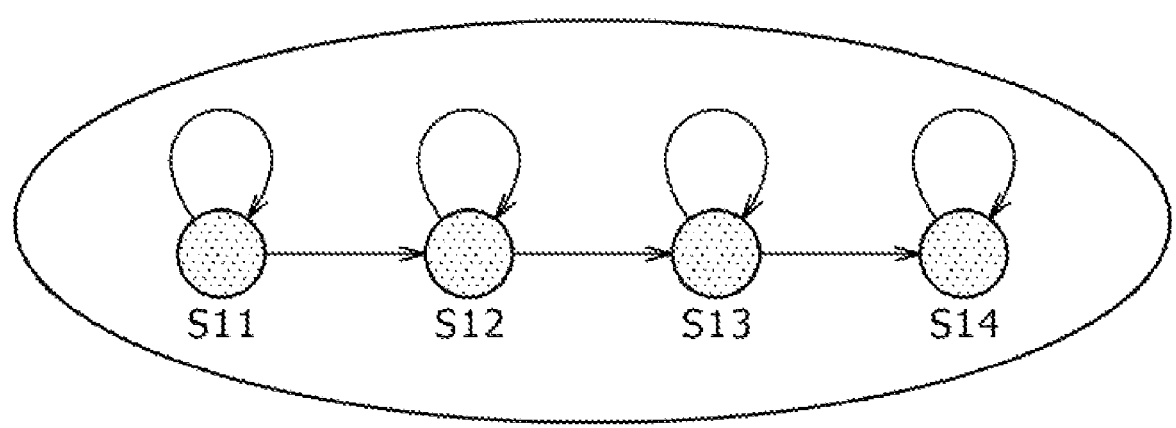

More specifically, the highlight learning unit 358 analyzes the rules of relevance of shot types between shots in order to find a state transition probability model, such as a hidden Markov model (HMM) shown in FIG. 41. The highlight learning unit 358 causes the model holding unit 302 to hold that model as the layer-1 statistical model. In FIG. 41, reference character S1$k$ ($k$ is an integer between 1 and 4) stands for an HMM state representing each of different shot types such as four-shot types "Long," "Medium," "Close-up" and "Out" shown in FIG. 30. In this manner, the probability of transition of each state (shot type transition) and the probability of occurrence of the state in question (corresponding shot type) are acquired by learning the layer-1 feature quantities of the above-described diverse learning-use images.

Likewise, the highlight learning unit 353 learns the layer-2 feature quantities of diverse learning-use images so as to create or update the layer-2 statistical model accordingly. The layer-2 statistical model thus created or updated is sent to and held by the model holding unit 302.

In this case, too, the HMM may be utilized as the layer-2 statistical model. Frame types may then be represented by the different HMM states. The specifics of the frame types are not restricted in any way; such details may be determined at the designers' discretion in view of the scenes to be extracted as highlights.

Illustratively, if the above-mentioned corner kick of a soccer match is to be extracted as a highlight, then it may be preferred to adopt seven frame types such as "Middle," "Goal Box," "Upper Corner," "Lover Corner," "Unknown," "Upper Goal," and "Lower Goal" as shown in FIG. 42.

The "Middle" type is a frame type that includes a white center line 371. The "Goal Box" type is a frame type that includes a goal gate 372 and excludes a corner position 373. The "Upper Corner" type is a frame type that excludes the goal gate 372 and includes the corner position 373 in the upper region of the frame. The "Lower Corner" type is a frame type that excludes the goal gate 372 and includes the corner position 373 in the lower region of the frame. The "Unknown" type is a frame type that excludes the white center line 371, goal gate 372, and corner position 373. The "Upper Goal" type is a frame type that include the goal gate 372 as well as the corner position 373 that is in the upper region of the frame. The "Lower Goal" type is a frame type that, includes the goal gate 372 as well as the corner position 373 that is in the lower region of the frame.

Each of the frames involved is checked and classified by the layer-3 feature quantity creation unit. 356 in FIG. 40 into one of the seven frame types outlined above.

More specifically, the object feature extraction unit 352 attempts to extract the white center line 371, goal gate 372, and corner position 373 as object features from each of the frames constituting a learning-use image. The unit 352 "attempts" the extraction because any or all of these object features may not be extracted from any given frame. For example, the goal gate 372 is not extracted from a frame classified as the "Upper Corner" type.

Based on the extractions coming from the object feature extraction unit 352, the layer-3 feature quantity creation unit 356 classifies each of the frames making up the learning-use image into one of the seven frame types. The results of the classification are sent to the layer-2 feature quantity creation unit 357 as layer-3 feature quantities.

The layer-3 feature quantity creation unit 304 may be structured either as a recognition unit that detects the frame type of each frame while working as a support vector machine (SVM) for learning by classification, or as a recognition unit that relies on neural networks for recognition purposes. The parameters for use by the recognition unit may be acquired by statistical learning based on corresponding image samples.

The layer-2 feature quantity creation unit 357 creates as layer-2 feature quantities the temporal transition of frame types between the frames within a shot that constitutes at least part of a corner kick scene of a soccer match. The layer-2 feature quantities thus created are supplied to the highlight learning unit 358.

Figure 43:
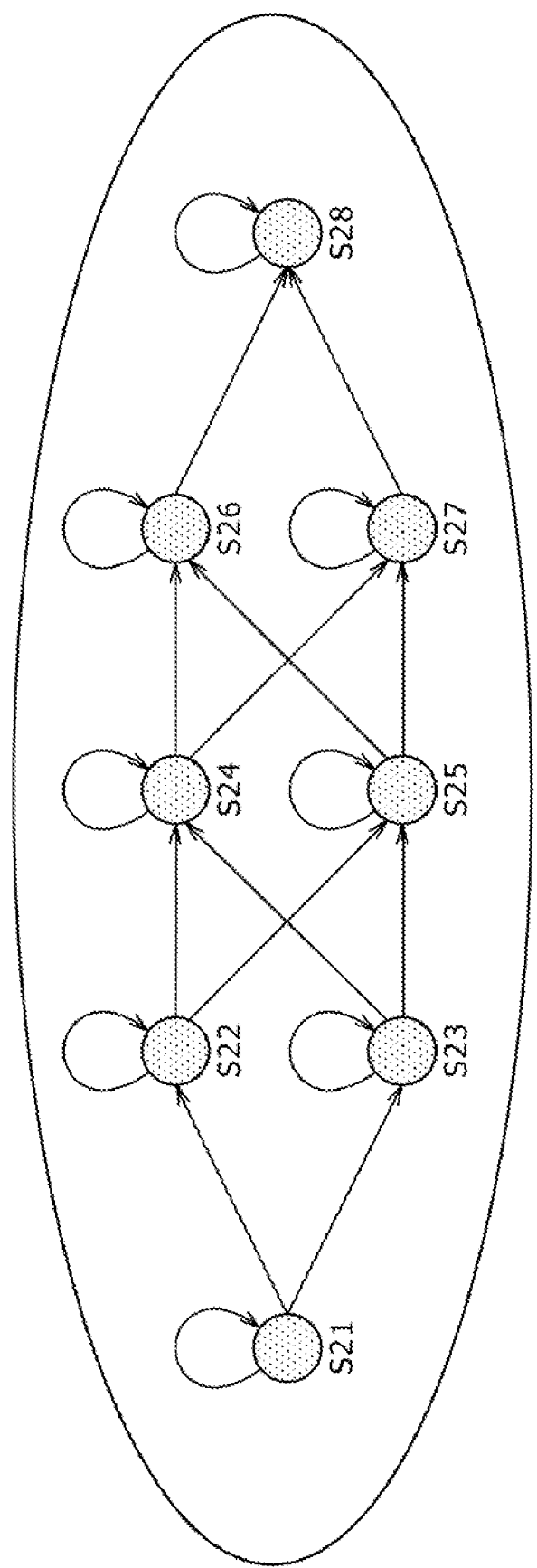

The highlight learning unit 358 may obtain a hidden Markov model (HMM) such as one shown in FIG. 43 and have it held by the model holding unit 302 as the layer-2 statistical model. In FIG. 43, reference character S2$m$ ($m$ is an integer between 1 and 8) stands for an HMM state representing each of different frame types such as seven frame types "Middle," "Goal Box," "Upper Corner," "Lower Corner," "Unknown," "Upper Goal," and "Lower Goal." In this manner, the probability of transition of each state (frame type transition) and the probability of occurrence of the state in question (corresponding frame type) are acquired by learning the layer-2 feature quantities of the above-described diverse learning-use images.

Figure 44:
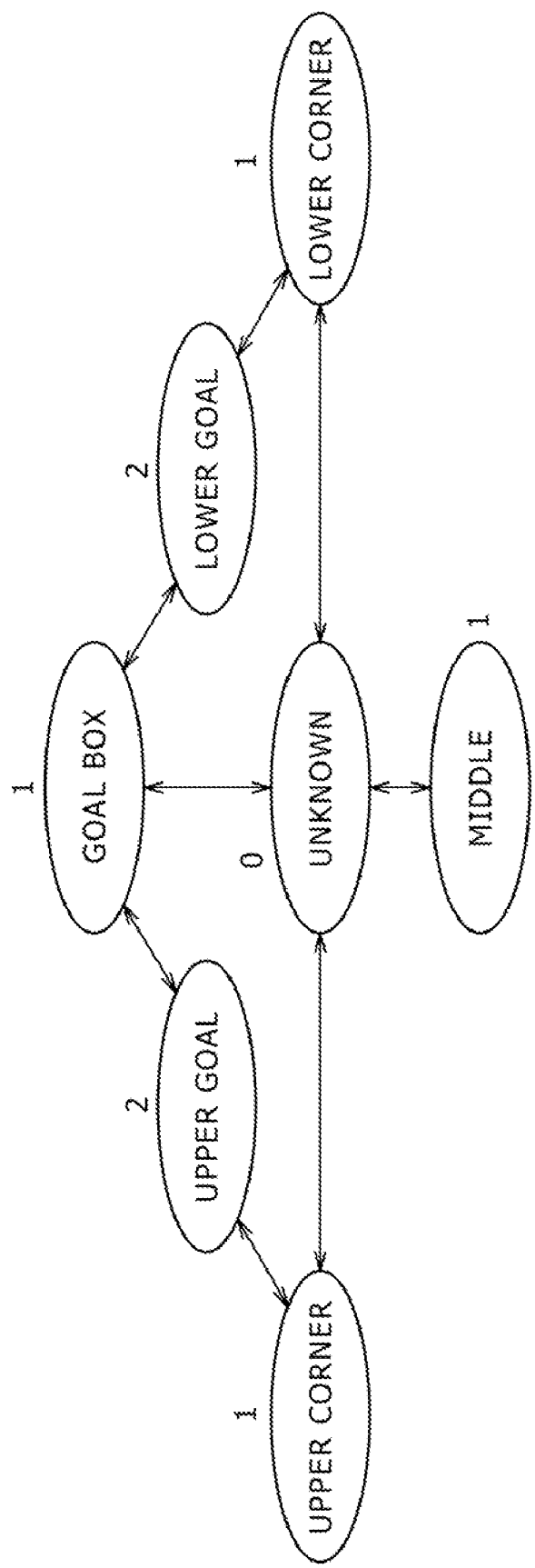

Illustratively, the learning by the highlight learning unit 358 may yield a state transition diagram such as one in FIG. 44. In this case, the state transition diagram may be held by the model holding unit 302 as the layer-2 statistical model.

The foregoing detailed description with reference to FIGS. 37 through 44 was about how the highlight detection unit 15 works as another component unit of the image processing apparatus in FIG. 1. Utilization of the highlight detection unit 15 implements the highlight detecting method that is designed through the analysis of the rules of relevance between shot types as well as the rules of relevance between frame types. The method, appreciably facilitates detection of diverse scenes as highlights from the moving image content.

The series of steps and processes described above may be executed either by hardware or by software. For the software-based processing to take place, the programs constituting the software may be either incorporated beforehand in dedicated hardware of a computer for program execution or installed upon use from a suitable program storage medium into a general-purpose personal computer or like equipment capable of executing diverse functions based on the installed programs.

Figure 45:
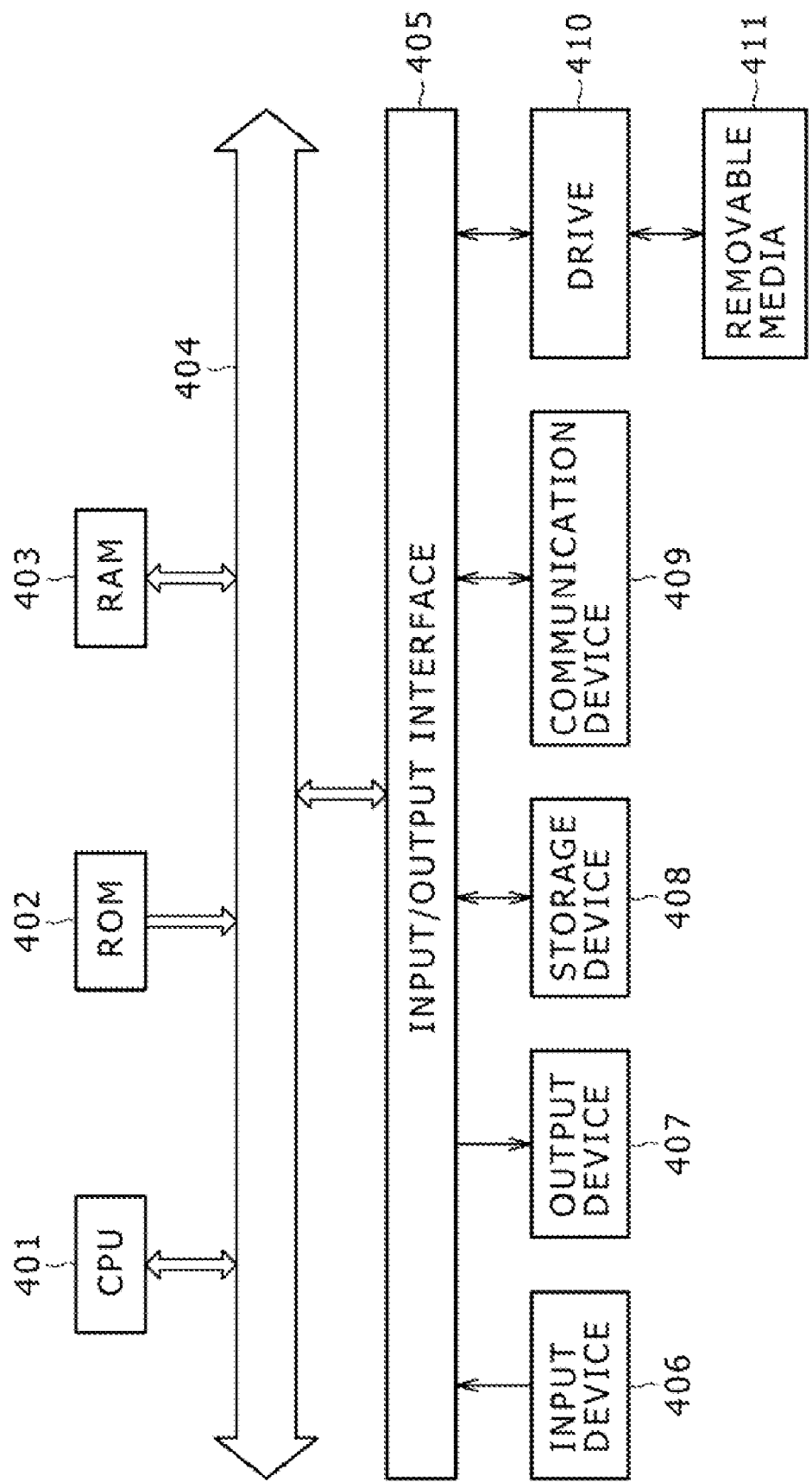
FIG. 45 is a block diagram showing a typical structure of a personal computer acting as an image processing apparatus according to the present invention.

FIG. 45 is a block diagram showing a typical structure of a personal computer capable of executing the above-described series of steps and processes. Illustratively, the image processing apparatus of FIG. 1 may be structured in its entirety or in part (e.g., some functional blocks) using the personal computer of FIG. 45.

In FIG. 45, a CPU (central processing unit) 401 performs various processes in accordance with the programs stored in a ROM (read only memory) 402 or in a storage device 408. A RAM (random access memory) 403 accommodates programs or data being executed or operated on by the CPU 403 as needed. The CPU 401, ROM 402, and RAM 403 are interconnected by a bus 404.

The CPU 401 is further connected to an input/output interface 405 via the bus 404. The input/output interface 405 is connected to an input device 406 and an output device 407. The input device 406 is typically made up of a keyboard, a mouse and a microphone. The output device 407 is constituted illustratively by a display unit and speakers. The CPU 401 performs diverse processes in response to the instructions entered through the input device 406 and outputs the result of the processing to the output device 407.

The storage device 403 connected to the input/output interface 405 is typically formed by a hard disk drive that, stores programs and data executed and operated on by the CPU 401. A communication unit 400 communicates with external equipment over a network such as the Internet or a local area network.

Programs may be acquired through the communication unit 409 before they are recorded to the storage device 408.

A drive 410 connected to the input/output interface 405 may foe loaded with removable media 411 such as a magnetic disk, an optical disk, a magneto-optical disk or a semiconductor memory. The drive 410 drives the loaded medium to acquire the programs or data recorded thereon. The programs and data thus acquired are transferred as needed to the storage device 408 for storage.

The program storage medium that accommodates computer-executable programs to foe installed into the computer may be provided in the form of the removable media 411 as shown in FIG. 45, e.g., package media constituted by the magnetic disk (including flexible disks), optical disk (including CD-ROM (compact disc-read only memory) and DVD (digital versatile disc)), magneto-optical disk, or semiconductor memory; or in the form of the ROM 402 or the storage device 408 (hard disk drive) where the programs are stored temporarily or permanently. The programs may be recorded as needed to the program storage medium through the communication device 409 handling diverse communication interfaces including routers and modems, by way of wired or wireless communication media including networks such as local area networks, the Internet, or digital satellite broadcasting networks.

In this specification, the steps which describe the programs stored on the program storage medium represent not only the processes that are to be carried out in the depicted sequence (i.e., on a time series basis) but also processes that may be performed parallely or individually and not chronologically.

In this specification, the term "system" refers to an entire configuration made up of a plurality of component devices or circuits.

It should be understood by those skilled in the art that various modifications, combinations, sub-combinations and alterations may occur depending on design requirements and other factor in so far as they are within the scope of the appended claims or the equivalents thereof.

What is claimed is:

1. An image processing apparatus for processing moving images each divisible into a plurality of shots, said image processing apparatus comprising:
 a holding unit configured to hold discrimination models acquired by learning beforehand a first rule and a second rule from a moving image formed by a plurality of known shot groups which are made up of at least one shot each and from which a highlight is to be extracted in accordance with said discrimination models, said first rule governing relevance between said shots, said second rule governing relevance between frames within each of said shots; and
 an extraction unit configured to extract from a newly input moving image a shot group recognized as said highlight in accordance with said discrimination models held in said holding unit.

2. The image processing apparatus according to claim 1, wherein the discrimination model based on said first rule is a time-series model acquired by learning a plurality of shot types as a state each; and
 wherein, from said newly input moving image, said extraction unit extracts the shot group recognized as said highlight representative of state transition between said shot types in accordance with said time-series model.

3. The image processing apparatus according to claim 2, wherein said time-series model is a hidden Markov model known as HMM.

4. The image processing apparatus according to claim 1, wherein the discrimination model based on said second rule is a time-series model acquired by learning a plurality of frame types as a state each; and
 wherein, from said newly input moving image, said extraction unit extracts the shot group including shots recognized as said highlight representative of state transition between said frame types in accordance with said time-series model.

5. The image processing apparatus according to claim 4, wherein said time-series model is a hidden Markov model known as HMM.

6. The image processing apparatus according to claim 5, wherein said plurality of frame types are each defined on the basis of at least one object feature includable in a frame;
 wherein said image processing apparatus further comprises a feature extraction unit configured to attempt extracting each of said at least one object feature from a plurality of frames constituting said newly input moving image; and
 wherein said extraction unit extracts said highlight on the basis of what is recognized as each of said frame types in said plurality of frames constituting said newly input moving image, the extractions being based on the attempt made by said feature extraction unit.

7. An image processing method for use with an image processing apparatus for processing moving images each divisible into a plurality of shots, said image processing method comprising the steps of:

holding, in said image processing apparatus, discrimination models acquired by learning beforehand a first rule and a second rule from a moving image formed by a plurality of known shot groups which are made up of at least one shot each and from which a highlight is to be extracted in accordance with said discrimination models, said first rule governing relevance between said shots, said second rule governing relevance between frames within each of said shots; and extracting from a newly input moving image a shot group recognized as said highlight in accordance with said discrimination models being held.

8. A computer program stored on a non-transitory computer readable medium for control over the processing of moving images each divisible into a plurality of shots, said program comprising the steps of:

allowing said computer to hold discrimination models acquired by learning beforehand a first rule and a second rule from a moving image formed by a plurality of known shot groups which are made up of at least one shot each and from which a highlight is to be extracted in accordance with said discrimination model, said first rule governing relevance between said shots, said second rule governing relevance between frames within each of said shots; and causing said computer to extract from a newly input moving image a shot group recognized as said highlight in accordance with said discrimination models being held.

* * * * *